US012610973B2

(12) United States Patent
Debon et al.

(10) Patent No.: US 12,610,973 B2
(45) Date of Patent: Apr. 28, 2026

(54) CITRUS FIBERS AND APPLICATIONS THEREOF

(71) Applicant: Cargill, Incorporated, Wayzata, MN (US)

(72) Inventors: Stéphane Jules Jérôme Debon, Vilvoorde (BE); Christina Desmet, Vilvoorde (BE); Marc Evarist Gustaaf Hendrickx, Leuven (BE); Katlijn Moelants, Vilvoorde (BE); Agnese Panozzo, Leuven (BE); Joe Wallecan, Vilvoorde (BE); Katleen Lucien Fiane Daisy Willemsen, Leuven (BE)

(73) Assignee: Cargill, Incorporated, Wayzata, MN (US)

( * ) Notice: Subject to any disclaimer, the term of this patent is extended or adjusted under 35 U.S.C. 154(b) by 386 days.

(21) Appl. No.: 16/469,801

(22) PCT Filed: Dec. 20, 2017

(86) PCT No.: PCT/US2017/067567
§ 371 (c)(1),
(2) Date: Jun. 14, 2019

(87) PCT Pub. No.: WO2018/119058
PCT Pub. Date: Jun. 28, 2018

(65) Prior Publication Data
US 2020/0077685 A1     Mar. 12, 2020

(30) Foreign Application Priority Data
Dec. 20, 2016     (EP) .................................... 16205313

(51) Int. Cl.
*A23L 19/00*          (2016.01)
*A23C 9/154*          (2006.01)
*A23L 33/22*          (2016.01)

(52) U.S. Cl.
CPC ............ *A23L 19/07* (2016.08); *A23C 9/1546* (2013.01); *A23L 33/22* (2016.08); *A23V 2002/00* (2013.01)

(58) Field of Classification Search
CPC . A23L 19/07; A23L 33/22; A23L 2/52; A23C 9/137; A23C 9/154; A23C 9/1544; A23C 9/1546; A23C 2240/15; A23V 2002/00; A23G 9/42; A23G 2200/14
USPC ........................................................ 426/588
See application file for complete search history.

(56) References Cited

U.S. PATENT DOCUMENTS

| | | | |
|---|---|---|---|
| 4,526,794 | A | 7/1985 | Altomare et al. |
| 6,183,806 | B1 | 2/2001 | Grossman et al. |
| 2006/0251789 | A1 | 11/2006 | Lundberg |
| 2017/0067567 | A1 | 3/2017 | No |

FOREIGN PATENT DOCUMENTS

| | | | |
|---|---|---|---|
| CN | 102395284 | A | 3/2012 |
| CN | 103637034 | A  * | 3/2014 |
| CN | 103002755 | B | 1/2015 |
| CN | 104780773 | B | 5/2021 |
| DE | 19943188 | A1 | 3/2001 |
| EP | 0295865 | B1 | 1/1994 |
| JP | 2013074850 | A | 4/2013 |
| WO | 0117376 | W | 3/2001 |
| WO | 2012016201 | A2 | 2/2012 |
| WO | 2013109721 | A2 | 7/2013 |
| WO | 2017019752 | W | 2/2017 |
| WO | 2017023722 | A1 | 2/2017 |

OTHER PUBLICATIONS

X. Chen, Machine Translation of CN 103637034, Mar. 2014 (Year: 2014).*
Arslanoglu , et al., "Preparation of Cation Exchanger From Lemon and Sorption of Divalent Heavy Metals", Bioresource Technology,, vol. 99, No. 7, Feb. 8, 2008 (Feb. 8, 2008), pp. 2699-2705, XP022472804, ISSN: 0960-8524, DOI: 10.1016/J.BIORTECH.2007. 05.022 Table 2, Aug. 2, 2008, 2699-2705.
Sedra , et al., "incorporation of citrus fibers in fermented milk containing probiotic bacteria", Food Microbiology, Academic Press Ltd, London, GB, vol. 25, No. 1, Nov. 8, 2007 (Nov. 8, 2007), pp. 13-21, XP022336921, ISSN: 0740-00200, DOI: 10.1016/J.FM.2007. 09.003 4.CONCLUSIONS, Nov. 8, 2007, 13-21.
Voragen, Visser J, "The Oscillating Mode—A Further Rheometric Technique", Pectines and Pectinass: Proceedings of an International Symposium, Wageningen, The Netherlands, Dec. 3-7, Elsevier Science, NL, Dec. 3, 1995 (Dec. 3, 1995), pp. 416-420, XP009193845, ISBN: 978-0-444-82330-4 Fig.9 on p. 418; p. 418, Mar. 12, 1995, 416-420.
Merve Kaya et al: "Characterization of citrus pectin samples extracted under different conditions: influence of acid type and pH of extraction", Annals of Botany., vol. 114, No. 6, Jul. 31, 2014, pp. 1319-1326, XP55535664, GB.
Pham T et al: "Evaluate the Chemical Composition of Peels and Juice of Seedless Lemon (*Citrus latifolia*) Grown in Hau Giang Province, Vietnam", IOP Conference Series: Materials Science and Engineering, vol. 991, No. 1, Dec. 2020, p. 012127, XP093023753.

* cited by examiner

*Primary Examiner* — Emily M Le
*Assistant Examiner* — Tynesha L Mcclain

(57)                ABSTRACT
The present invention relates to dry citrus fibers having a moisture content of at most 20 wt % relative to the total amount of citrus fiber and having a storage modulus (G') of at least 280 Pa, wherein said dry citrus fibers have a pH of between 4.0 and 8.7.

17 Claims, 7 Drawing Sheets

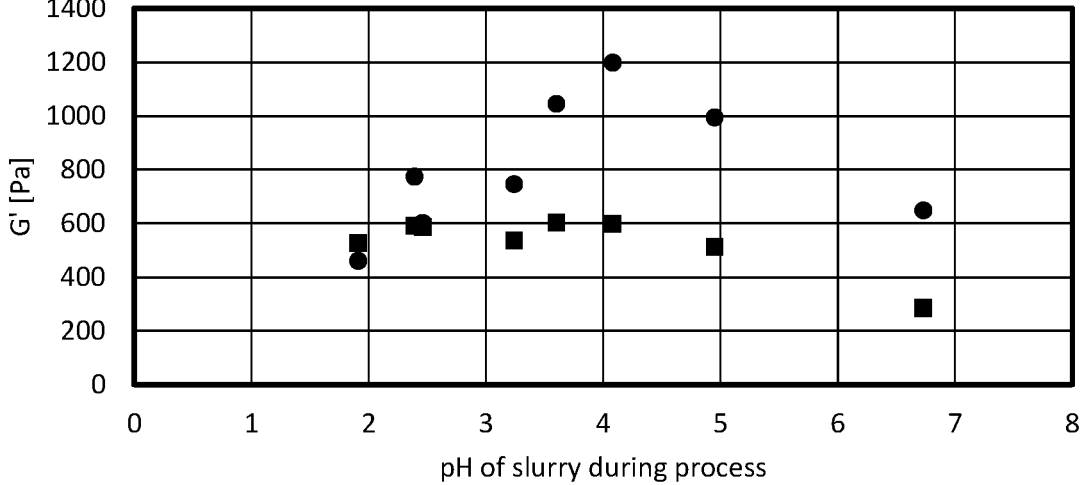
FIGURE 1.1

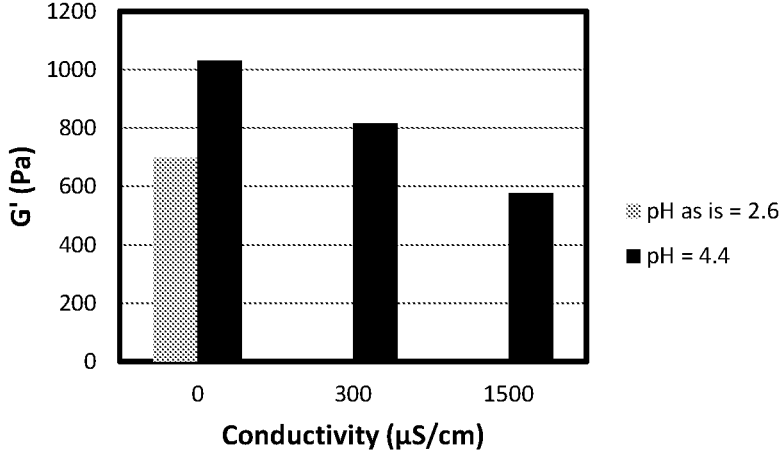
FIGURE 1.2 A
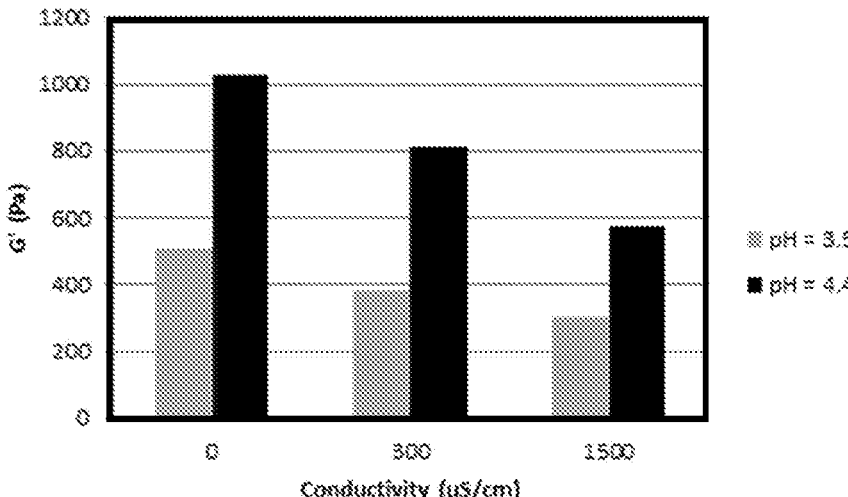
FIGURE 1.2 B

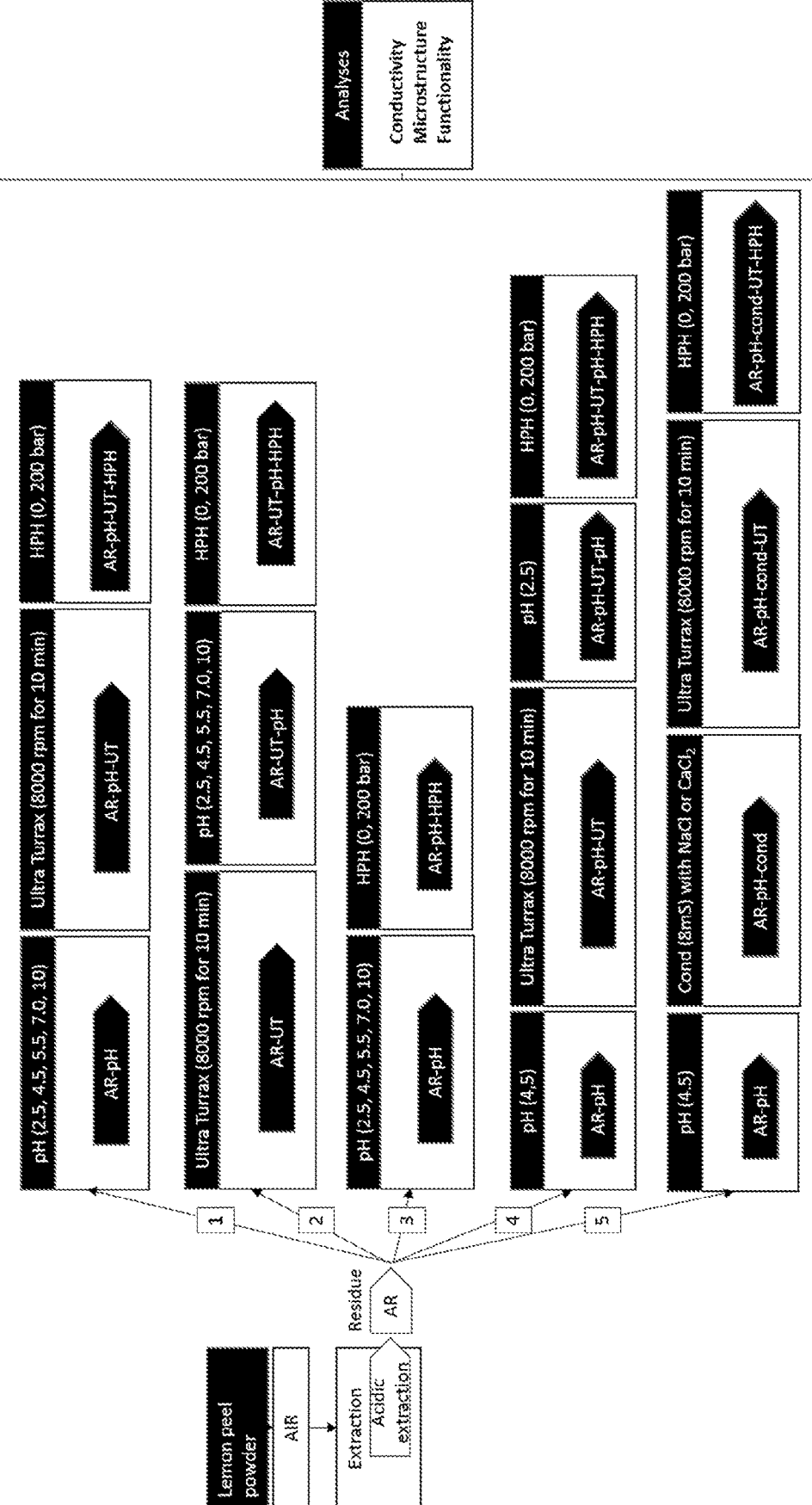
FIGURE 2.1

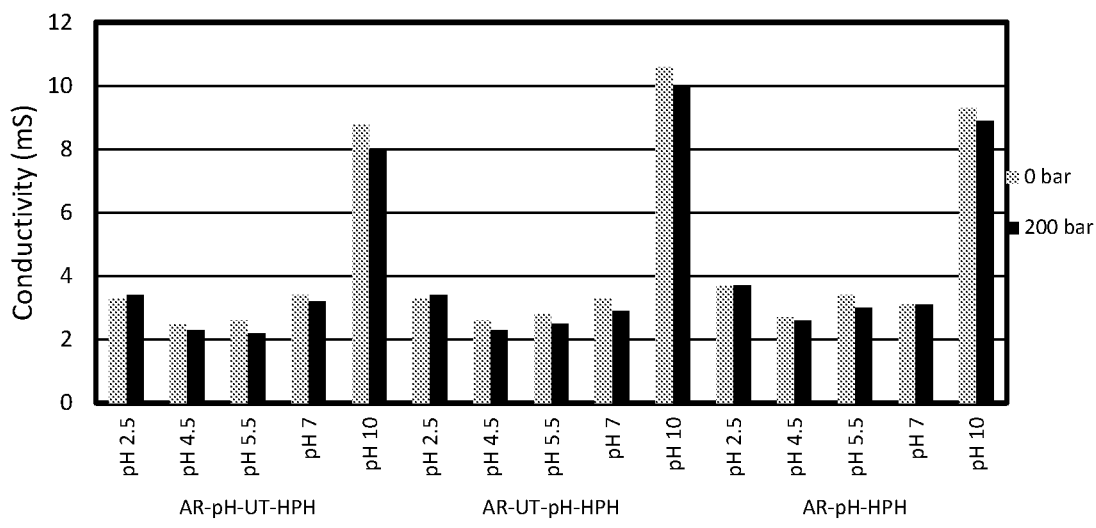
FIGURE 3.1
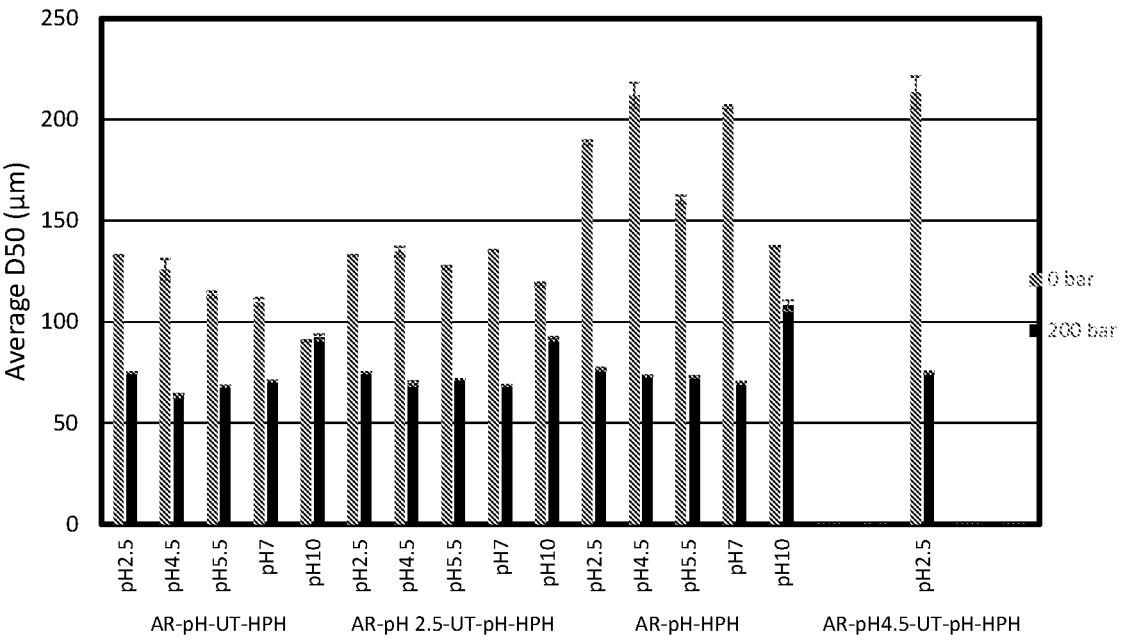
FIGURE 3.2

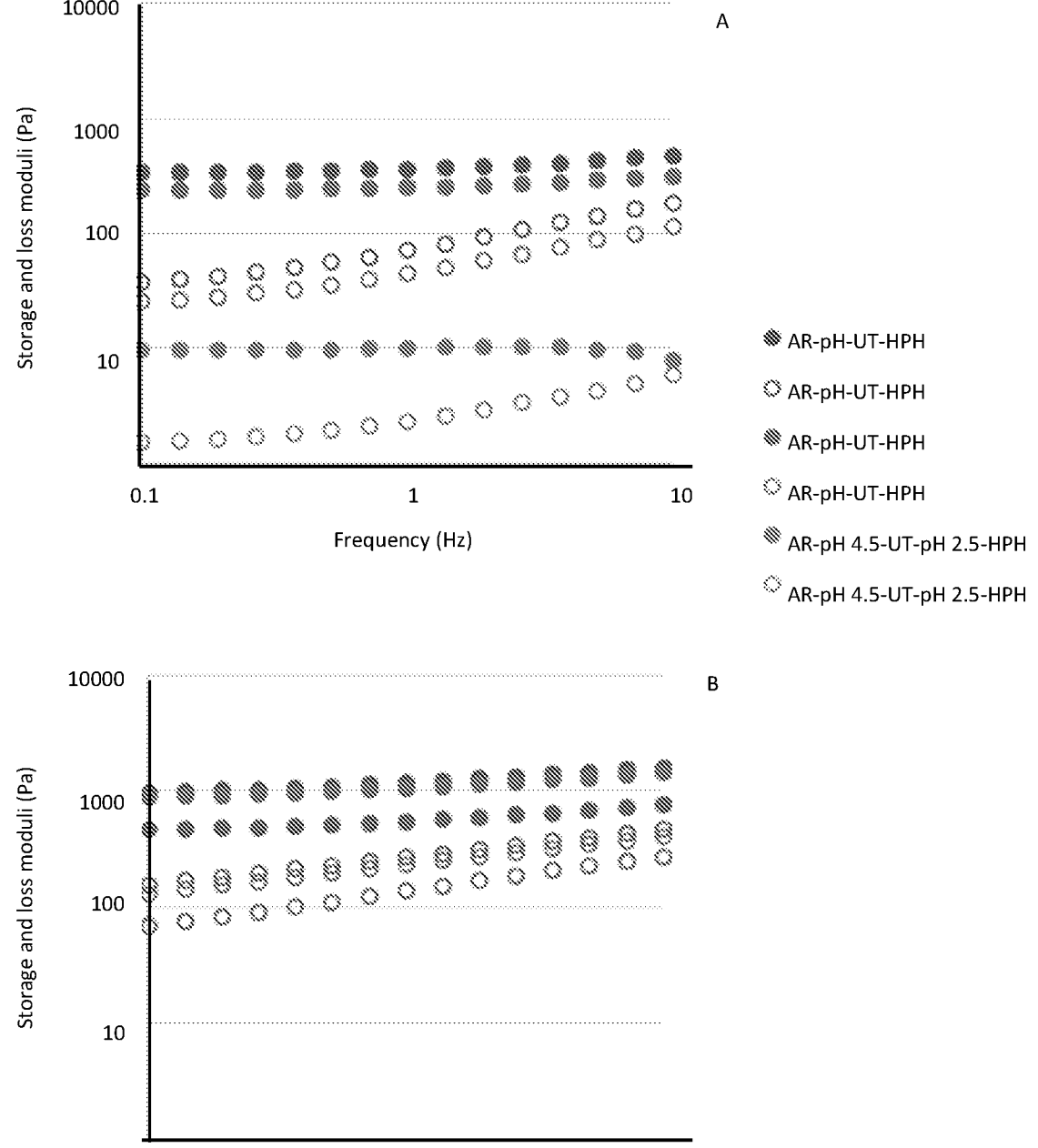
FIGURE 3.3

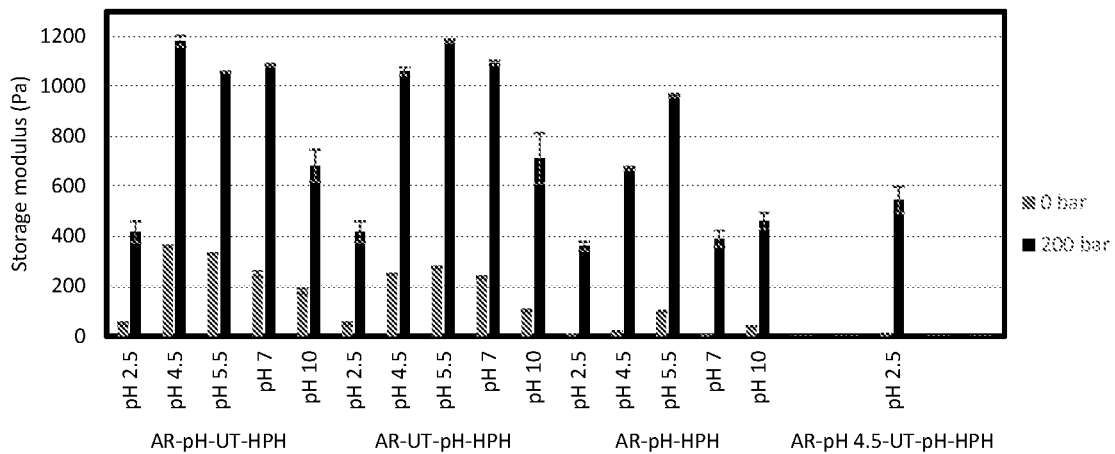
FIGURE 3.4
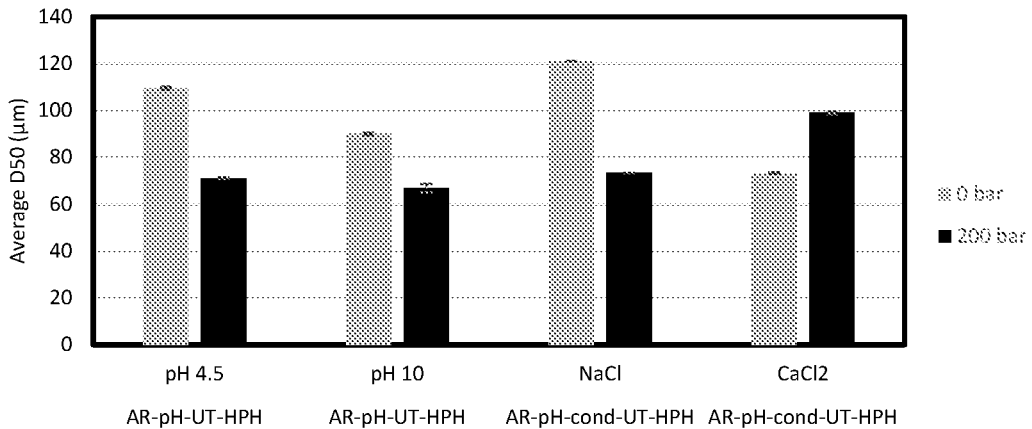
FIGURE 3.5
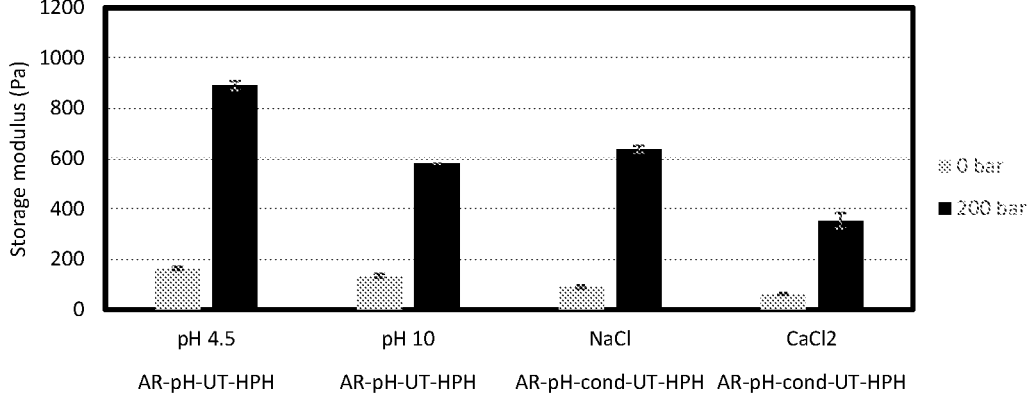
FIGURE 3.6

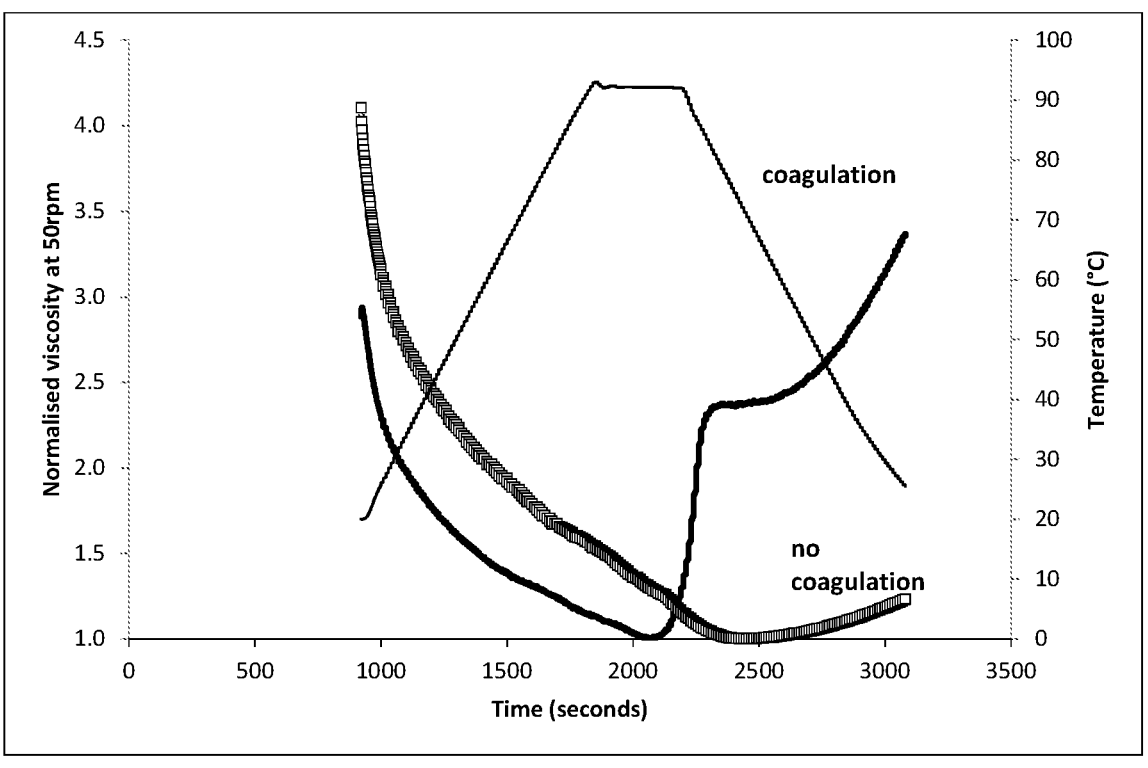
FIGURE 4.1

CITRUS FIBERS AND APPLICATIONS THEREOF

CROSS REFERENCE TO RELATED APPLICATIONS

This application is a national phase application of PCT/US17/67567, filed 20 Dec. 2017, entitled CITRUS FIBERS AND APPLICATIONS THEREOF, which claims the benefit of priority to European Application No. 16205313.6, filed 20 Dec. 2016, entitled CITRUS FIBERS AND APPLICATIONS THEREOF, which are hereby incorporated by reference in their entirety.

FIELD OF THE INVENTION

The present invention relates to citrus fibers having optimized properties, method for manufacturing thereof and various uses of the fibers in particular in food products such as dairy and meat products, beverages, creamers and the like, but also in personal care and pharmaceutical products.

BACKGROUND OF THE INVENTION

In the last decades, the increase in consumer's interest in health and environmental issues has boosted the demand for overall natural and sustainable food products or ingredients with technological and/or health-related properties. In this context, the integrated utilisation of by-products stemming from fruit and vegetable processing, provides an interesting solution for reducing food waste, enriching food products with dietary fibres, and generating natural texturizer, thus meeting the environmental, nutritional, and technological consumer's requirements.

Despite the abundance of fruit and vegetable by-products, their exploitation as natural food ingredients is still limited. The reason for the under-exploitation of these by-products is that fruit and vegetable matrices consist of a complex three-dimensional network of cell wall fibres. Such network is made of cellulose fibrils embedded in a matrix of pectin and hemicellulose (Cosgrove, 2005). The cellulose fibrils are immobilized by intra- and intermolecular hydrogen bonding and hydrophobic interactions, while pectin and hemicellulose are characterized by higher degree of mobility (Cosgrove, 2014). Within this polysaccharide network a little amount of protein is also included (Lamport, Kieliszewski, Chen, & Cannon, 2011; Sampedro & Cosgrove, 2005). To unlock the full structuring potential of these fibres, or in other words to functionalize them, the compact cell wall fibre network must be unraveled allowing for higher hydration and swelling of the fibres.

Functionalization of plant cell wall fibers can be achieved by mechanical treatments (Foster, 2011). In this context, high pressure homogenisation has been shown to affect the functionality of plant-based material such as cell wall fibers, by both reducing the particle dimension as well as enabling fibre network formation (Augusto, Ibarz, & Cristianini, 2013; Lopez-Sanchez et al., 2011; Tan & Kerr, 2015; Van Buggenhout et al., 2015; Winuprasith & Suphantharika, 2013). During high pressure homogenisation a fluid is forced through a narrow gap in the homogenizer valve, where it undergoes a rapid acceleration (Dumay et al., 2013; Floury, Legrand, & Desrumaux, 2004). Consequently the fluid is subjected to cavitation, shear and turbulence phenomena that are simultaneously induced, and lead to a temperature increase depending on the intensity of the pressure applied (Paquin, 1999). Recent results proved high pressure homogenisation to be effective in increasing the viscoelastic properties of cell wall fiber suspensions, e.g. lemon peel fibre suspensions. The increase in storage modulus of the lemon peel fibre suspensions was shown to be favoured by a partial removal of pectin. Similarly, Sankaran et al. (2015) reported that the enzymatic degradation of pectin favoured the loosening of carrot cell wall fibres upon high pressure homogenisation.

In addition, the viscoelastic properties of fibre suspensions were shown to depend not only on their composition, but also on their physicochemical characteristics (Kunzek, Müller, Vetter, & Godeck, 2002). Therefore, any environmental parameter affecting these characteristics, such as pH and presence of salts, is likely to affect the mechanical processing effects (Sankaran, Nijsse, Bialek, Shpigelman, et al., 2015; Shpigelman, Kyomugasho, Christiaens, Van Loey, & Hendrickx, 2014).

All of the above publications, demonstrate that functionalizing cell wall material is not a trivial task and that compromises have to be made between the properties thereof. For example, attempting to adjust both the pH and the rheology of the cell wall fibers may lead to either a pH modified product with poor rheological characteristics, or to a functional product with natural pH. In addition, when pH modified products were dried for storage to low moisture contents, these products seemed to have lost some of their functionality. In consequence their utilisation seemed to be less straightforward especially in demanding application such as the typical applications for the dairy industry.

There is therefore a need in the industry for a functionalized cell wall material which has an optimum combination of properties. For example, in the pharmaceutical industry, there is a need for a texturant able to texturize pharmaceutical liquids having a reduced charge concentration and a neutral or close to neutral pH, e.g. ophthalmic liquids, liquids for patients following a reduced salt diet, drug delivery liquids, etc. Unfortunately, the available texturants either negatively influence the pH of the pharmaceutical liquids, either do not possess the right functionality for imparting to such liquids optimum rheological properties.

Also, in dairy industry there is a long felt need for a functionalized cell wall material which can help texturizing dairy products without affecting them negatively. Processing and marketing of milk are important levels of growth in dairy industry. Lack of equipment and skills are greatest impediment in processing of milk while for the dairies to remain competitive in the market, they need to diversify their product through value addition using simple and cost effective methods. Product diversification, however, implies the production of dairies having at least various textures, tastes, sensorial and rheological properties at a quality that meets the market opportunities.

Citrus fibers are known to have many interesting properties making them suitable for adjusting the texture in a variety of food and feed products, beverages, but also in personal care, pharmaceutical and detergent products. For the manufacturing of any of the above products, citrus fibers may be used in dry form (dry citrus fibers) or they may be dispersed in an aqueous medium. In particular the use of dry citrus fibers is advantageous due to the fibers' longer shelf life and reduced costs of shipping from a fiber production plant or storage site to a processing facility.

Dry citrus fibers and compositions containing thereof as well as methods for manufacturing are for example known from WO 2006/033697, WO 2012/016190, WO 2013/109721, DE 199 43 188 and US 2006/251789. When carefully dried, these known citrus fibers may retain an optimum free surface area available for binding water upon rehydration and dispersion, which in turn provides said fibers with thickening capabilities, good stability, and the capacity to create optimum textures. Using various techniques such as the one disclosed in WO 2012/016201, the properties of the dry citrus fibers can be further tailored to provide optimum functionalities.

However, drying citrus fibers without affecting their properties, e.g. chemical, physical, rheological and water binding characteristics such as water holding capacity and swelling volume, is difficult. In particular, after hydrating dried citrus fibers and incorporating thereof together with other ingredients into product recipes may lead to products having undesirable organoleptic and sensorial properties. For example, the citrus fibers may deleteriously interact with the other ingredients and impair the manufacturing thereof or lead to products having unacceptable textures and/or sensorial properties.

Also when using citrus fibers in the manufacturing of dairy products, problems may arise due to undesirable effects stemming from the interaction of the fibers with the milk constituents, which in turn can lead to unacceptable product characteristics.

Moreover, in addition to milk, fermented milk compositions have an important nutritional role and are one of the basic products of dietary regimes. Many milk and fermented milk based products were introduced in the recent decades, and all these products although appealing to the public have highly similar sensory and organoleptic properties, lacking thus differentiation. This is because milk is highly sensitive to texturants, emulsifiers, and other ingredients added thereto and there are limited choices of such ingredients which do not cause undesirable effects e.g. precipitation of the milk proteins. One reason thus that dairy products lack a true differentiation in their texture, sensory and organoleptic properties may be the above mentioned limited choice of texturants.

It is also known that when using acidic pH ingredients, e.g. known citrus fibers having an acidic pH, in protein based applications, e.g. meat applications, the products containing thereof may be affected by undesirable color change and/or protein denaturation. As a consequence, the appealability to the consumer and/or shelf life of meat based products containing citrus fibers may be deleteriously affected.

It is thus the object of the present invention to provide a texturant which allows an optimum modulation, alteration and/or adaptation of the properties of products, in particular pharmaceutical products, meat based products and dairy products. It is also an object of the present invention to provide a texturant, which has the ability to influence not only the texture, flow, mouthfeel and/or ingestion of products but it may also favorably impact the biological mechanisms of digestion and/or deliver desired physiological impacts. It is also an object of the present invention to provide a texturant having an optimum combination of properties, in particular pH, rheology and moisture content.

SUMMARY OF THE INVENTION

Faced with the drawbacks mentioned above, the present inventors surprisingly observed that at least some of the drawbacks were alleviated when utilizing dry citrus fibers, and in particular dry spent citrus peel fibers, having a storage modulus (G') of at least 280 Pa and a pH of between 4.0 and 8.7.

In particular the inventors observed that the citrus fibers of the invention (hereinafter "the inventive citrus fibers" do not negatively interact, or interact in a less destructive way with milk and/or meat components such as lactose, fat, vitamins, protein and minerals. Without being bound to any theory, the inventors believe that due to such an optimized interaction with said components, a designer of dairy or meat products may have increased freedom in providing novel textures, appearance and sensorial and rheological properties thereof.

Also in pharmaceutical products containing a liquid medium, and in particular an aqueous medium, having a reduced charge concentration, the inventive citrus fibers can be used to optimally adjust the rheological properties thereof while influencing less the pH of said liquids.

The inventors also observed that in accordance with the circumstances, the inventive citrus fibers may allow an optimum modulation, alteration and/or adaptation of the properties of products containing thereof, allowing a reduction in the number of ingredients and hence a simplification of their recipes.

When used in food products for example, the inventive citrus fibers may positively influence not only the texture, flow, mouthfeel and/or ingestion of said products but may also favorably impact the biological mechanisms of digestion and/or deliver desired physiological impacts. For meat applications, the inventive citrus fibers may influence less the color thereof and/or the protein denaturation.

When used in personal care products, the inventive citrus fibers may positively influence the appearance of the product and allow for an optimum transfer of active materials present in such products to hair, skin or other places in need of care. The same may be true for pharmaceutical products also.

Other advantages of the inventive citrus fibers will become apparent from the detailed description of the invention given hereunder.

DRAWINGS

FIG. 1.1 shows the properties of the obtained fibers, wherein the G' of fiber suspensions in low conductivity water (represented by circles) and buffer solution (represented by squares) after rehydration is represented vs the pH of the slurry during processing (before homogenization).

FIGS. 1.2A and 1.2B show the G' properties of fibers in function of conductivity of the dispersing medium of fibers with pH adjustment to 4.4 and fibers without pH adjustment (pH as is) during processing.

FIG. 2.1 shows the experimental set-up to study the effect of pH of the wet milling and activation of the raw material.

FIG. 3.1 shows electrical conductivity of AR lemon peel fraction (non-wet milled and wet milled (UT)) adjusted to pH 2.5, 4.5, 5.5, 7.0, and 10.0 in non-homogenized and homogenized conditions.

FIG. 3.2 shows average particle diameter (D50) of acid insoluble (AR) lemon peel residue (non-wet milled and wet milled (UT)) suspensions adjusted to pH 2.5, 4.5, 5.5, 7.0, and 10.0 in non-homogenized and homogenized conditions. Error bars represent the standard deviation.

FIG. 3.3 shows frequency sweep of acid insoluble (AR) lemon peel residue suspensions adjusted to pH 4.5, wet milled (UT) (before or after pH adjustment), non-readjusted or readjusted to pH 2.5, non-homogenized (A) and homogenized at 200 bar (B). Full and void markers correspond to the storage and loss moduli, respectively.

FIG. 3.4 shows storage modulus corresponding to 1 Hz frequency of acid insoluble (AR) lemon peel residue suspensions adjusted to pH 2.5, 4.5, 5.5, 7.0, and 10, non-wet milled and wet milled (UT) (before or after pH adjustment), non-readjusted or readjusted to pH 2.5, non-homogenized (0 bar) and homogenized at 200 bar. Error bars represent the standard deviation.

FIG. 3.5 shows average particle size (D50) of acid insoluble (AR) lemon peel residue adjusted to pH 4.5 and 10, conductivity of 8 mS/cm (with either NaCl or $CaCl_2$), wet milled (0 bar), and homogenized at 200 bar. AR lemon peel residue at pH 4.5 and 10 without conductivity adjustment are considered as controls. Error bars represent the standard deviation.

FIG. 3.6 shows storage modulus corresponding to 1 Hz frequency of acid insoluble lemon peel residue (AR) adjusted to pH 4.5 and 10, and conductivity of 8 mS/cm (with either NaCl or $CaCl_2$), wet milled (0 bar), and homogenized at 200 bar. AR lemon peel residue at pH 4.5 and 10 without conductivity adjustment are considered as controls. Error bars represent the standard deviation.

FIG. 4.1 shows the normalised apparent viscosity (at 50 rpm) versus temperature and time.

DETAILED DESCRIPTION OF THE INVENTION

The invention relates to dry citrus fibers having a storage modulus (G') of at least 200 Pa, wherein said fibers have a pH of between 4.0 and 8.7.

The term "fiber" as used herein, refers to an elongated object, the fiber having a length (major axis, i.e. the largest dimension that can be measured on the fiber) and a width or diameter (minor axis, i.e. the smallest dimension that can be measured on the fiber) and having length to width ratio of at least 3, more preferably at least 9, or most preferably at least 15, as observed and measured by a high-resolution transmission electron microscope ("TEM"). The dimensions of the fibers are preferably measured on "wet" fibers, i.e. fibers having a moisture content of at least 20 wt % relative to the total weight of fibers; for example wet fibers can be obtained by extracting them without drying from an inventive dispersion prepared by dispersing an amount of 0.1 wt % fibers relative to the total weight of the dispersion in the aqueous medium.

Citrus fibers are fibers contained by and obtained from the fruits of the citrus family. The citrus family is a large and diverse family of flowering plants. The citrus fruit is considered to be a specialized type of berry, characterized by a leathery peel and a fleshy interior containing multiple sections filled with juice filled sacs. Common varieties of the citrus fruit include oranges, sweet oranges, clementine, kumquats, tangerines, tangelos, satsumas, mandarins, grapefruits, citrons, pomelos, lemons, rough lemons, limes and leech limes. The citrus fruit may be early-season, mid-season or late-season citrus fruit. Citrus fruits also contain pectin, common in fruits, but found in particularly high concentrations in the citrus fruits.

The citrus fibers are typically obtained from a source of citrus fibers, e.g. citrus peel, citrus pulp, citrus rag or combinations thereof. Moreover, the citrus fibers may contain the components of the primary cell walls of the citrus fruit such as cellulose, pectin and hemicelluloses and may also contain proteins.

Citrus fiber is to be distinguished from citrus peel, citrus pulp (sometimes referred to as citrus vesicles), which are whole juice sacs, coarse pulp, floaters, citrus cells, floating pulp, juice sacs, or pulp, all of these being sources of citrus fibers. Citrus fiber is to be distinguished from citrus rag also, which is a material containing segment membrane and core of the citrus fruit. Within the meaning of the invention, citrus fibers are fibers extracted or obtained from said sources of citrus fibers.

Very good results were achieved when the inventive citrus fibers are obtained from spent citrus peel, i.e. citrus peel which was subjected to a de-pectinization process wherein the pectin contained by said peel was extracted from said peel, e.g. by well-known methods using acids. Preferably, the spent citrus peel is a peel wherein at least 10 wt % of the pectin (relative to the total mass of the peel) was extracted therefrom by acid extraction, more preferably at least 20 wt % of pectin was extracted, even more preferably at least 30 wt %, yet even more preferably at least 40 wt %, most preferably at least 50 wt %. Citrus fibers obtained from spent citrus peel are hereinbefore and after referred to as spent citrus peel fibers (SCPF).

The most preferred inventive citrus fibers are those obtained from lemon, orange or lime spent peel, with levels of extracted pectin within the above mentioned preferred ranges.

Preferably, the citrus fibers of the invention did not undergo any substantial chemical modification, i.e. said fibers were not subjected to chemical modification processes, in particular esterification, derivation or men-induced enzymatic modification or combinations thereof.

Preferably, the citrus fibers in accordance with the invention have a crystallinity of at least 10%, more preferably at least 20%, most preferably at least 30% as measured on a dried (less than 20 wt % water content relative to the content of fibers) sample by X-ray diffraction method (Seagal method). Preferably, the crystallinity of said fibers is between 10% and 60%.

The citrus fibers of the invention are in dry form, which is herein understood as containing an amount of liquid, e.g. water and/or organic solvent, of less than 20 wt % relative to the total weight of the fibers. Preferably said fibers contain an amount of water (i.e. moisture content) relative to the total weight of the fibers of at most 20 wt %, more preferably at most 16 wt %, even more preferably at most 12 wt %, even more preferably at most 10 wt %, most preferably at most 8 wt %. Such dry fibers may be more economical to transport and store while being readily dispersible in the aqueous medium.

The storage modulus G' is commonly used in the food industry to analyze the rheological properties of dispersions and in particular fiber-based dispersions. In the art, by fiber-based dispersion is understood fibers or compositions containing thereof dispersed in an aqueous medium. G' is a measure of a deformation energy stored in the dispersion during the application of shear forces and provides an excellent indication of the dispersion's viscoelastic behavior. When referring herein to citrus fibers having a certain G', is in fact meant that the G' of said fibers is measured on an aqueous medium containing an amount of 2 wt % of citrus fibers, i.e. relative to the total weight of the aqueous medium. When fibers are dispersed under low-shear in an aqueous medium, it is highly desirable to achieve dispersions having G' values as high as possible at concentrations of fibers as low as possible.

The present inventors noticed that the citrus fibers of the invention were able to meet the above requirements and hence, in addition to their excellent water binding characteristics, these novel fibers may impart food formulations containing thereof with optimum rheological properties. The novel citrus fibers have also an improved dispersibility in that they are readily dispersible. Moreover, since said citrus fibers may be used at lower concentrations to achieve increased G' values, food manufactures may have increased design freedom for food formulations, in that they may be able to add or remove constituents while maintaining optimum viscoelastic properties thereof.

The G' of the citrus fibers of the invention is at least 280 Pa, preferably at least 300 Pa, even more preferably at least 400 Pa, yet even more preferably at least 450 Pa, yet even more preferably at least 500 Pa, most preferably at least 550 Pa. More preferably, said G' is at least 650 Pa, even more preferably at least 700 Pa, yet more preferably at least 750 Pa, yet more preferably at least 800 Pa, yet more preferably at least 900 Pa, even more preferably at least 1000 Pa, most preferably at least 1200 Pa. The values of said G' are preferably measured in a low conductivity liquid medium (e.g. RO water), preferably a liquid medium which contains water, i.e. an aqueous medium. Preferably, said liquid medium has a conductivity of at least 0.1 mS/cm, more preferably at least 0.5 mS/cm, most preferably at least 1.0 mS/cm. Preferably said conductivity is at most 20 mS/cm, more preferably at most 15 mS/cm, even more preferably at most 12 mS/cm, yet even more preferably at most 10.0 mS/cm, yet even more preferably at most 8.0 mS/cm, most preferably at most 6.0 mS/cm.

Preferably, the citrus fibers of the invention are readily dispersible citrus fibers. The term "readily dispersible" as used herein means that it is not necessary to use high-shear means, e.g. high-shear mixers or homogenizers, to disperse the fibers in an aqueous medium such as water; but rather that the dispersion of the fibers can be accomplished with low-shear stirring equipment, such as for example, magnetic stirrers or mechanical stirrers, e.g. an IKA® Eurostar mechanical stirrer equipped with an R1342 4-bladed propeller stirrer or a Silverson L4RT overhead batch mixer equipped with an Emulsor Screen (e.g. with round holes of about 1 mm diameter).

Non-limiting examples of aqueous mediums include pure water, a water solution and a water suspension, but also those liquid mediums contained by dairy products such as milk, yoghurt and the like; personal care products such as lotions, creams, ointments and the like; and pharmaceutical products.

The inventors surprisingly observed that the citrus fibers of the invention manifest these high G' values upon being dispersed in an aqueous medium under low shear, i.e. stirring with less than 10000 rpm. This is even more surprising since said high G' values were achieved at the low fiber concentrations, e.g. of 2 wt %. The aqueous medium preferably contains water in an amount of at least 75 wt %, more preferably at least 85 wt %, most preferably at least 95 wt %, relative to the total amount of the medium. Preferably, the stirring used to achieve the dispersion of the fibers of the invention in the aqueous medium is at most 8000 rpm, more preferably at most 5000 rpm, most preferably at most 3000 rpm. The inventors observed that most pronounced advantages were achieved when the citrus fibers of the invention were dispersed in an aqueous medium having a conductivity of at least 0.1 mS/cm, more preferably at least 0.5 mS/cm, most preferably at least 1.0 mS/cm. Preferably said conductivity is at most 20 mS/cm, more preferably at most 15 mS/cm, most preferably at most 12 mS/cm, yet even more preferably at most 10.0 mS/cm, yet even more preferably at most 8.0 mS/cm, most preferably at most 6.0 mS/cm.

The inventive citrus fibers have pH of between 4.0 and 8.7. Preferably, said fibers have a pH of at least 4.3, more preferably at least 4.5, even more preferably at least 4.7, most preferably at least 5.0. Said fibers have a pH of at most 8.7, preferably at most 8.5, more preferably at most 8.0, even more preferably at most 7.5, yet even more preferably at most 7.0, most preferably at most 6.5. The inventors observed that citrus fibers having a pH within the above preferred ranges may improve the stability of process using thereof and the shelf life of the various products containing said fiber.

The inventive citrus fibers may contain an additive, since the inventors observed that in at least some instances, the additive may positively influence the water binding characteristics and rheological properties of the fibers. When present in the citrus fibers, the additive is preferably distributed therebetween. By the term "additive distributed therebetween" is herein understood that said additive is distributed inside a volume defined by the totality of fibers and preferably also between the microfibrils forming the fibers. Preferably, the additive is present in an additive:fiber (A:F) ratio of between 0.1:1.00 and 10.00:1.00 by weight, more preferably between 0.20:1.00 and 9.00:1.00 by weight, most preferably between 0.50:1.00 and 8.00:1.00 by weight.

The additive used in accordance with the invention is preferably chosen from the group consisting of a sugar, a protein, a polysaccharide, a polyol and combinations thereof. More preferably, said additive is chosen from the group consisting of a sugar, a protein, a polysaccharide, a sugar alcohol and combinations thereof. Examples of sugars may include, without being limited thereto, monosaccharides such as fructose, mannose, galactose, glucose, talose, gulose, allose, altrose, idose, arabinose, xylose, lyxose, sorbose and ribose; and oligosaccharides such as sucrose, maltose, lactose, lactulose, and trehalose. Preferred proteins are those accepted in the food industry, e.g. gelatin, pea protein or pea protein hydrolisates. Preferred polysaccharides are those having a general formula $(C_6H_{10}O_5)_n$ with n being preferably between 2 and 40, more preferably between 2 and 30, most preferably between 2 and 20. Examples of polysaccharides include, without being limited thereto, dextrins such as maltodextrin, cyclodextrin, amylodextrin; and starches. Preferred sugar alcohols are those having the general formula $HOCH_2(CHOH)_mCH_2OH$ with m being preferably between 1 and 22, more preferably between 1 and 10, most preferably between 1 and 4. Examples of sugar alcohols may include, without being limited thereto, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol and combinations thereof.

Most preferably, the inventive citrus fibers are additive-free, i.e. no additive is present inside the volume defined by the totality of fibers. The benefit of additive-free citrus fibers is that the process of making such fibers is simplified and products having a clearer label can be produced.

Preferably, the inventive citrus fibers have a water holding capacity (WHC) of at least 35 mL of water per gram of anhydrous (about 0% moisture) fibers, the WHC being determined on an aqueous medium containing 1 wt % (relative to the total weight of said medium) of said fibers dispersed therein after subjecting said medium to a G-force of 3000 G. Preferably, said WHC is at least 36 milliliters of water (mL) per gram of fibers (g), more preferably at least 38 mL/g, most preferably at least 40 mL/g.

Preferably the inventive citrus fibers have a SV of at least 40%, more preferably at least 45%, most preferably at least 50%, when determined on an aqueous medium containing 0.1 wt % (relative to the total weight of said medium) of said fibers dispersed therein. The protocol for determining the SV at low concentrations of fibers (e.g. about 0.1 wt %) is described in the METHODS OF MEASUREMENT section hereinbelow.

The invention further relates to a method of producing the inventive citrus fibers, comprising the steps of:

a. Providing an aqueous slurry of a source of citrus fibers, preferably spent citrus peel;

b. Adjusting the pH of said slurry to between 4.0 and 8.7;

c. Homogenizing the pH adjusted aqueous slurry to obtain an aqueous slurry of citrus fibers having a pH between 4.0 and 8.7;

d. Preferably contacting the aqueous slurry of citrus fibers with an organic solvent to obtain a precipitate phase and a liquid phase;

e. Preferably separating said precipitate phase from the liquid phase to obtain a semi-dry cake comprising citrus fibers; and f. Preferably desolventizing and/or dehydrating said semi-dry cake; and g. Recovering dry citrus fibers having a G' of at least 280 Pa and a pH between 4.0 and 8.7.

It is difficult to prepare dry citrus fibers without affecting their water binding characteristics and/or dispersibility in an aqueous media. This difficulty is attributed to many factors (collectively referred to in literature as "hornification") such as the formation of hydrogen bonds and/or lactone bridges between the fibers. Hornification typically reduces the available free-surface area of the fibers and/or strengthens the linkage between the fibers, which in turn may reduce the capacity of the fibers to absorb, bind and hold liquid and to disperse. Hornified dry citrus fibers either cannot be dispersed into an aqueous medium, e.g. water, a water solution or a water suspension, or they can be dispersed only by using high or ultra-high shear mixing. The method of the invention succeeded however in producing dry citrus fibers having excellent water binding characteristics and rheological properties.

The method of the invention (the inventive method), contains a step of homogenizing a pH adjusted aqueous slurry of a source of citrus fibers ("source slurry"). The terms "slurry" and "dispersion" mean the same within the context of the present invention and are used interchangeably herein. The source of citrus fibers may be citrus peel, citrus pulp, citrus rag or combinations thereof. The source of citrus fibers may also be a by-product obtained during previous processing of citrus originating material, e.g. a pectin extraction process. Preferably, the source of the citrus fibers is citrus peel; more preferably is de-pectinized citrus peel. Said source slurry preferably comprises a dry substance content of at least 2 wt %, more preferably at least 3 wt %, more preferably at least 4 wt %. Preferably said dry substance content of said source slurry is at most 20 wt %, more preferably at most 15 wt %, even more preferably at most 10 wt %, yet even more preferably at most 8 wt %, most preferably at most 6 wt %.

The pH of the source slurry is adjusted to between 4.0 and 8.7. Preferred ranges are given above and will not be repeated herein. Such pH adjustment can be made according to known means in the art, non-limiting examples thereof including using NaOH or $Na_2CO_3$.

The homogenization of the pH adjusted source slurry may be carried out with a number of possible methods including, but not limited to, high shear treatment, pressure homogenization, cavitation, explosion, pressure increase and pressure drop treatments, colloidal milling, intensive blending, extrusion, ultrasonic treatment, and combinations thereof.

In a preferred embodiment, the homogenization of the pH adjusted source slurry is a pressure homogenization treatment which may be carried out with a pressure homogenizer. Pressure homogenizers typically comprise a reciprocating plunger or piston-type pump together with a homogenizing valve assembly affixed to the discharge end of the homogenizer. Suitable pressure homogenizers include high pressure homogenizers manufactured by GEA Niro Soavi of Parma (Italy), such as the NS Series, or the homogenizers of the Gaulin and Rannie series manufactured by APV Corporation of Everett, Massachusetts (US). During the pressure homogenization, said source slurry is subjected to high shear rates as the result of cavitation and turbulence effects. These effects are created by the source slurry entering a homogenizing valve assembly which is part of a pump section of the homogenizer at a high pressure (and low velocity). Suitable pressures for the inventive method are from 50 bar to 2000 bar, more preferably between 100 bar and 1000 bar. While not being bound to any theory, it is believed that the homogenization process causes disruptions of the source of citrus fibers and its disintegration into the fibrous component, while the pH of said slurry aids in optimizing the homogeneity of said fibrous component.

Depending on the particular pressure selected for the pressure homogenization, and the flow rate of the pH adjusted source slurry through the homogenizer, said source slurry may be homogenized by one pass through the homogenizer or by multiple passes. In one embodiment, the source slurry is homogenized by a single pass through the homogenizer. In a single pass homogenization, the pressure used is preferably from 300 bars to 1000 bars, more preferably from 400 bars to 900 bars, even more preferably from 500 bars to 800 bars. In another preferred embodiment, said source slurry is homogenized by multiple passes through the homogenizer, preferably at least 2 passes, more preferably at least 3 passes through the homogenizer. In a multi-pass homogenization, the pressure used is typically lower compared to a single-pass homogenization and preferably from 100 bars to 600 bars, more preferably from 200 bars to 500 bars, even more preferably from 300 bars to 400 bars.

The result of the homogenization step is an aqueous slurry of citrus fibers ("fibers slurry") having essentially the same pH and comprising a dry substance content of fibers in essentially the same amount as the pH adjusted source slurry. It is not excluded that during the homogenization, the pH may vary; in such cases the pH of the obtained aqueous slurry of citrus fibers should be readjusted to a value within the required range. Said fibers slurry is then contacted with an organic solvent. Said organic solvent should preferably be polar and water-miscible to better facilitate water removal. Examples of suitable organic solvents which are polar and water-miscible include, without limitation, alcohols such as methanol, ethanol, propanol, isopropanol and butanol. Ethanol and isopropanol are preferred organic solvents; isopropanol is the most preferred organic solvent for use in the inventive method. The organic solvent can be used in its 100% pure form or may be a mixture of organic solvents. The organic solvent can also be used as a mixture of the organic solvent and water, hereinafter referred to as an aqueous solvent solution. The concentration of organic solvent in said aqueous solvent solution is preferably from about 60 wt % to about 100 wt % relative to the total weight of said solution, more preferably between 70 wt % and 95 wt %, most preferably between 80 wt % and 90 wt %. In general, lower concentrations of the organic solvent are suitable to remove water and water-soluble components whereas increasing the concentration of said organic solvent also helps in removing oil and oil-soluble components if desired. In one embodiment, an organic solvent mixture containing a non-polar organic (NPO) co-solvent and the organic solvent or the aqueous solvent solution is used in the inventive method. The utilization of the organic solvent mixture may improve for example the recovery of oil-soluble components in the citrus pulp. Examples of suitable NPO co-solvents include, without limitation, ethyl acetate, methyl ethyl ketone, acetone, hexane, methyl isobutyl ketone and toluene. The NPO co-solvents are preferably added in amounts of up to 20% relative to the total amount of organic solvent mixture.

The fibers slurry is contacted with the organic solvent preferably in a ratio slurry:solvent of at most 1:8, more preferably at most 1:6, or most preferably at most 1:4. Preferably said ratio is at least 1:0.5, more preferably at least 1:1, most preferably at least 1:2. Preferably, said fibers slurry is contacted with the organic solvent for at least 10 minutes, more preferably for at least 20 minutes, most preferably for at least 30 minutes. Preferably, said slurry is contacted with the organic solvent for at most several hours, more preferably for at most 2 hours, most preferably for at most 1 hour.

According to the invention, said fibers slurry is contacted with said organic solvent to obtain a precipitate phase and a liquid phase. The inventors observed that during contacting the organic solvent with the fibers slurry, the fibers slurry releases at least part of its water content into the organic solvent which in turn causes the citrus fibers to precipitate. By "precipitate phase" is herein understood a phase containing the majority of the citrus fibers, e.g. more than 80% of the total amount of fibers, preferably more than 90%, most preferably more than 98% and also containing organic solvent and water. The precipitate phase usually settles due to gravity forces. The precipitate phase typically has a solid- or a gel-like appearance, i.e. it essentially maintains its shape when placed on a supporting surface. By "liquid phase" is herein understood a phase containing organic solvent and water. The liquid phase may also contain some citrus fibers which did not precipitate.

Preferably, the precipitate phase is in the form of granules, preferably, millimeter-size granules. Preferred granule sizes are between 1 mm and 100 mm, more preferably between 5 mm and 50 mm By "the size of a granule" is herein understood the biggest dimension of said granule. The formation of the precipitate phase into granules may be achieved for example by bringing under agitation the fibers slurry into a container containing the organic solvent or by pouring said slurry in the organic solvent. The amount of agitation typically dictates the size of the formed granules. It was observed that by forming granules, the subsequent water removal from said granules is facilitated. Without being bound to any theory, it is believed that the formation of granules also aids in preserving and/or increasing the free surface area of the citrus fibers available for water binding and may also avoid a collapse of the fibers.

The precipitate phase is subsequently separated from the liquid phase to obtain a semi-dry citrus fibers cake ("fiber cake"). Said separation can be achieved using known methods such as centrifugation, filtration, evaporation and combinations thereof.

To increase the dry substance content, steps d) and e) of the inventive method can be repeated at least one time, preferably before carrying out step f). The fiber cake can also be subjected to an extraction step. A preferred extraction method is pressing, e.g. with a normal press, a screw press or an extruder. A more preferred extraction method is pressure filtration using a volume chamber filter press or a membrane filter press; pressure filters being sold for example by BHS Sonthofen, DE. Two-sided liquid removal is recommended for the pressure filtration since more filtering area is available per volume of the fiber cake.

The fiber cake is semi-dry, i.e. it has a dry substance content of preferably at least 10 wt %, more preferably of at least 15 wt %, or most preferably of at least 20 wt % relative to the mass of said cake. Preferably, said cake has a liquid-content of at most 50 wt %, more preferably at most 40 wt %, most preferably at most 30 wt % relative to the total mass of said cake. The liquid typically contains organic solvent and water.

Preferably, the fiber cake is comminuted to obtain grains containing citrus fibers ("fiber grains"), said grains preferably having a diameter of at most 100 mm, more preferably at most 50 mm, even more preferably at most 30 mm, yet even more preferably at most 10 mm, yet even more preferably at most 5 mm, most preferably at most 3 mm. With "grain diameter" is herein understood the largest dimension of the grain. The diameter may be determined using a microscope equipped with graticule. Cutters may be used to cut the fiber cake into grains. Alternatively, the fiber cake can subjected to milling and/or grinding in order to form it into grains. Examples of suitable means to comminute the fiber cake include without limitation a cutter mill, a hammer mill, a pin mill, a jet mill and the like.

The fiber grains may be mixed with an additive to obtain semi-dry citrus fibers comprising the additive. Examples of suitable additives as well as preferred choices are given above and will not be repeated herein. Mixing the fiber grains with the additive can be effected with known means in the art, examples thereof including without limitation a malaxer, a transport screw, an air-stream agitation mixer, a paddle mixer, a Z-mixer, a tumble mixer, a high speed paddle mixer, a power blender and the like. The additive may be provided in a solid form or in solution. Preferably, the additive is provided in a solid form, more preferably as a powder, even more preferably as a powder having an average particle size ("APS") of between 100 and 500 μm, more preferably between 150 and 300 μm; the APS can be determined by ASTM C136-06.

The semi-dry citrus fibers are subjected to a desolventizing and/or dehydrating step wherein the organic solvent and/or the water are extracted from said semi-dry citrus fibers. Preferably, the inventive method contains both steps of desolventizing and dehydration. It was surprisingly observed that during the organic solvent and/or water extraction, the hornification of citrus fibers was largely prevented. Without being bound to any theory, the inventors attributed the reduced hornification to the careful pre-processing of the citrus fibers prior to said extraction as detailed in steps a) to d) of the inventive method.

Desolventisation and dehydration of said semi-dry citrus fibers can be carried out with a desolventizer which removes organic solvent and/or water from the fibers and may also enable the organic solvent to be reclaimed for future use. Desolventizing also ensures that the obtained dry citrus fibers are safe for milling and commercial use. The desolventizer can employ indirect heat to remove the organic solvent from the semi-dry citrus fibers; the advantage of using said indirect heat is that significant amounts of organic solvents can be extracted. Also, direct heat can be provided for drying, e.g. by providing hot air from flash dryers or fluidized bed dryers. Direct steam may be employed, if desired, to remove any trace amounts of organic solvent remaining in the fibers. Vapors from the desolventizer preferably are recovered and fed to a still to reclaim at least a portion of the organic solvent.

Retention times for the desolventizing and/or dehydrating step may vary over a wide range but can be about 5 minutes or less. Suitable temperatures at which said desolventizing and dehydrating step is carried out depend on such factors as the type of organic solvent and most often ranges from about 4° C. to about 85° C. at atmospheric pressure. Temperatures can be appropriately increased or decreased for operation under supra- or sub-atmospheric pressures. Optionally, techniques such as ultrasound are used for enhancing efficiency of the desolventizing and dehydrating. By maintaining a closed system, solvent losses can be minimized Preferably, at least about 70 wt % of the organic solvent is recovered and reused.

Dehydration can be effected with known means in the art, examples thereof including without limitation paddle driers, fluidized bed driers, stirred vacuum driers, drum driers, plate driers, belt driers, microwave driers and the like. Preferably, the dehydration temperature is at most 100° C., more preferably at most 80° C., most preferably at most 60° C. Preferably, the dehydration temperature is at least 30° C., more preferably at least 40° C., most preferably at least 50° C.

The desolventizing and/or dehydrating step are carried out to obtain dry citrus fibers, said dry citrus fibers having a moisture content of at most 20 wt % relative to the total weight of the fibers with the additive, preferably at most 15 wt %, more preferably at most 12 wt %, even more preferably at most 10 wt %, most preferably at most 8 wt %.

Optionally, the method of the invention further comprises a step of classifying the dry citrus fibers with or without the additive to obtain the desired particle size and/or packing the dry citrus fibers.

In a preferred embodiment, the inventive method comprises a classification step of the dry citrus fibers which may improve the homogeneity of the powder, narrow particle size distribution and improve degree of rehydration. Classification may be carried out using either a static or dynamic classifier. The inventive method may further comprise a packaging step of the dry fibers.

The dry citrus fibers are preferably milled and/or classified to obtain a powder having an average particle size of preferably at least 50 μm, more preferably at least 150 μm, most preferably at least 250 μm. Preferably said average particle size is at most 2000 μm, more preferably at most 1000 μm, most preferably at most 500 μm. Said average particle size may be determined by ASTM C136-06.

In one of its aspects, the invention relates to citrus fibers in dry form obtainable by the method of the present invention.

It was observed that the inventive fibers have optimal water binding characteristics and/or rheological properties. These properties may lead to optimal quality of various products containing thereof, e.g., food, feed, personal care and pharmaceutical products.

The inventive fibers are suitably used in the production of a large variety of food compositions. Examples of food compositions comprising thereof, to which the invention relates, include: luxury drinks, such as coffee, black tea, powdered green tea, cocoa, adzuki-bean soup, juice, soya-bean juice, etc.; milk component-containing drinks, such as raw milk, processed milk, lactic acid beverages, etc.; a variety of drinks including nutrition-enriched drinks, such as calcium-fortified drinks and the like and dietary fiber-containing drinks, etc.; dairy products, such as butter, cheese, yogurt, coffee whitener, whipping cream, custard cream, custard pudding, etc.; iced products such as ice cream, soft cream, lacto-ice, ice milk, sherbet, frozen yogurt, etc.; processed fat food products, such as mayonnaise, margarine, spread, shortening, etc.; soups; stews; seasonings such as sauce, TARE, (seasoning sauce), dressings, etc.; a variety of paste condiments represented by kneaded mustard; a variety of fillings typified by jam and flour paste; a variety or gel or paste-like food products including red bean-jam, jelly, and foods for swallowing impaired people; food products containing cereals as the main component, such as bread, noodles, pasta, pizza pie, corn flake, etc.; Japanese, US and European cakes, such as candy, cookie, biscuit, hot cake, chocolate, rice cake, etc.; kneaded marine products represented by a boiled fish cake, a fish cake, etc.; live-stock products represented by ham, sausage, hamburger steak, etc.; daily dishes such as cream croquette, paste for Chinese foods, gratin, dumpling, etc.; foods of delicate flavor, such as salted fish guts, a vegetable pickled in sake lee, etc.; liquid diets such as tube feeding liquid food, etc.; supplements; and pet foods; creamers (dairy and non-dairy), condensed milk, alcoholic beverages, in particular those containing dairy products, e.g. irish cream whiskey and the like; and sport drinks. These food products are all encompassed within the present invention, regardless of any difference in their forms and processing operation at the time of preparation, as seen in retort foods, frozen foods, microwave foods, etc.

The present invention further relates to the use of the inventive citrus fibers in dairy products, e.g. yogurt {e.g., spoonable, drinkable, and frozen), sour cream, cheese products, sauces (cheese and white), pudding, and frozen desserts. Unexpectedly, it was observed that said fibers can be used in dairy products with a resulting smooth texture and essentially without any loss in viscosity or creaminess. Said fibers can be used as an additive to dairy products, i.e. in addition to the fat contained by such products. Alternatively, said fibers can be used to substitute some or even all of the fat in dairy products, to obtain reduced-fat or fat-free products in which case such use may result in a decreased caloric content of the final dairy product {e.g., a reduction of at least 10%, or at least 50%).

As used herein, additive means any substance added to a base material in low concentrations for a definite purpose. In the United States, the Food and Drug Administration sets the allowable levels of food additives after evaluating the safety and toxicity of the additive. Additives may be essential to the existence of the end product, such as the use of emulsifiers in mayonnaise or leavening agents in bread products. Alternatively, additives may perform a secondary function, e.g. may function as thickeners, flavoring agents, or coloring agents. The inventive citrus fibers described herein may used as additives in dairy products.

Dairy product as used herein means milk or any food product prepared from non-vegetable milk (e.g., cow milk, sheep milk, goat milk, and the like), whether in a dry or a non-dry form, including butter, cheese, ice cream, pudding, sour cream, yogurt (e.g., spoonable, drinkable, and frozen) and condensed milk. In a less preferred embodiment, products manufactured with vegetable milk, e.g. soy milk, and vegetable milk-based products can also be used in the examples described herein.

Cheese is herein understood as a food prepared from the pressed curd of milk, often seasoned and aged.

Lipid is a term describing a product comprising fats and/or fat-derived materials. Fat is herein understood as an ester of glycerol and three fatty acids. A fatty acid is a carboxylic acid typically having a carbon chain from 4-22 carbon atoms in length and usually having an even number of carbon atoms in the chain. The fatty acids can be saturated, i.e., containing no double bonds, or unsaturated, i.e., containing one or more double bonds. Fats can be found both in animal products and in some plant products.

Ice cream is herein understood as a smooth, sweet, cold food prepared from a frozen mixture of milk products and flavorings. In the United States ice cream contains a minimum of 10% milkfat and 10% nonfat milk solids (see, 2 1 C.F.R. § 135.1 10). However, the disclosure is not limited to this specific range, as the required percentages of milkfat and nonfat milk solids in ice creams can vary in other countries or jurisdictions.

Yogurt is herein understood as a dairy product produced by culturing cream, milk, partially skimmed milk, or skim milk with a characterizing bacterial culture that contains lactic acid-producing bacteria, such as *Lactobacillus delbrueckii* ssp. and *Streptococcus thermophilus*. Exemplary yogurts include, but are not limited to, spoonable yogurt, yogurt dip, frozen yogurt, and drinkable yogurt. By definition in 2 1 C.F.R. § 13 1.200, regular yogurt in the United States has a milkfat content of at least 3.25%. The fat content of regular yogurts typically ranges from 3.25% to about 3.8%, although there are yogurts on the market with a fat content of about 10%. As defined in 21 C.F.R. § 13 1.203, in the United States low-fat yogurts have not less than 0.5% milkfat and not more than 2% milkfat. A nonfat yogurt has less than 0.5% milkfat in the United States as defined in 2 1 C.F.R. § 131.206. However, other ranges maybe observed in other countries.

Dairy products may be prepared using methods known to those skilled in the art, e.g. WO2009/079002, except that the inventive citrus fiber is added or used to replace some or all of the fat in said products. Said fibers can be added at one of several points during the manufacture of the dairy product, e.g. they may be added to the milk prior to pasteurization. Said fibers can be added in their dry form or, alternatively, an aqueous dispersion may be prepared by dispersing said fibers in an aqueous environment and then adding said dispersion to the milk.

The inventive citrus fibers can be used to substitute some or all of the fat in the dairy product. Preferably, said fibers are used in an amount sufficient to substitute at least 5% of the fat, more preferably said amount substitutes at least 10% of said fat, even more preferably at least 20%, yet more preferably at least 50%, yet more preferably at least 75%, most preferably essentially all fat is replaced by said fibers.

The inventive citrus fibers are added to the dairy product to give a final concentration in the dairy product of up to about 10 wt % fibers, more preferably up to 7 wt % fibers, even more preferably up to 5 wt % fibers, most preferably up to 3 wt % fibers. Preferably said final concentration is between 0.01 and 10 wt %, more preferably between 0.03 and 7 wt %, most preferably between 0.05 and 5 wt %.

Replacing some or all of the fat with the inventive citrus fibers can lower the caloric content of the dairy product, e.g., replacing half of the fat in sour cream man lower the caloric content by about one-third. Preferably, the amount of fibers is chosen to reduce the caloric content of the dairy product with at least 10%, more preferably at least 20%, even more preferably at least 30%, yet more preferably at least 50%, most preferably at least 75%. The inventors surprisingly observed that reducing the caloric content of the dairy product has no or little impact on the other properties thereof, e.g. rheological, sensory, appearance and the like.

In one embodiment, the dairy product is an yoghurt and the inventive citrus fibers are added to give a final concentration of up to about 7 wt % fibers, more preferably up to 5 wt % fibers, even more preferably up to 3 wt % fibers, most preferably up to 1 wt % fibers. Preferably said final concentration is between 0.01 and 5 wt %, more preferably between 0.05 and 3 wt %, most preferably between 0.1 and 1 wt %. The yoghurt is preferably chosen from the group consisting of a spoonable yoghurt, a yogurt dip, a frozen yogurt and a drinkable yogurt. The inventors observed that the resulting yogurt has a creamier and smoother texture than the one where fat is used alone. The creaminess is similar to that obtained by adding more fat to the yogurt, however by using said fibers, no substantial increase in calories is achieved. The resulting yogurt has also a smooth appearance with none or very few apparent curds and an appealing pudding-like texture.

In another embodiment, the dairy product is a reduced-fat yogurt in which the inventive citrus fibers are used to substitute at least 5% of the fat, more preferably at least 10% of said fat, even more preferably at least 20%, yet more preferably at least 50%, yet more preferably at least 75%, most preferably essentially all fat is substituted with said fibers. Said fibers have the potential to reduce the caloric content of the yogurt, increase its viscosity, enhance its mouthfeel and texture, or combinations thereof. These reduced-fat yogurts also can have a smoother texture than full-fat yogurts or other reduced-fat yogurts produced without said fibers.

In another embodiment, the dairy product is a sour cream wherein the inventive citrus fibers are used in the preparation thereof. Preferably, said fibers are used to substitute at least 5% of the fat, more preferably at least 10% of said fat, even more preferably at least 20%, yet more preferably at least 50%, yet more preferably at least 75%, most preferably essentially all fat is substituted with said fibers. By using said fibers the caloric content of the sour cream may be reduced, its viscosity increased, its mouthfeel and creaminess enhanced, or combinations thereof.

In another embodiment, the dairy product is a cheese sauce that contains the inventive citrus fibers. The fiber-containing cheese sauce can include up to about 5 wt % fiber relative to the weight of the sauce, preferably at most 3 wt %, more preferably at most 1 wt %. Preferably, the amount of said fibers in said cheese sauce is between 0.05 and 5 wt %, more preferably between 0.1 and 3 wt %, most preferably between 0.5 and 1 wt %.

In another embodiment, the dairy product is a process cheese food that contains the inventive citrus fibers. The fiber-containing cheese food can include up to about 7 wt % fiber relative to the weight of the food, preferably at most 5 wt %, more preferably at most 3 wt %. Preferably, the amount of said fibers in said cheese food is between 0.01 and 7 wt %, more preferably between 0.1 and 5 wt %, most preferably between 1 and 3 wt %.

In additional embodiments, improvements in creaminess have been observed when the inventive citrus fibers are incorporated into other dairy products, including cheese products, pudding and frozen desserts. In some instances, said fibers are added to reduce or substitute for fat in the dairy products. In other cases, said fibers are added to full-fat products.

Prepared products can be assessed by sensory evaluation, i.e., mouthfeel.

Mouthfeel is herein understood as a product's physical and chemical interaction in the mouth. Mouthfeel is a concept related to testing and evaluation of food products. It is a result of information relayed by sensors reporting taste, smell and tactile sensations. Foods are evaluated from initial perception through chewing and swallowing. Factors that are assessed include, among others, adhesiveness, chewiness, coarseness, denseness, dryness, graininess, hardness, heaviness, moisture absorption or release, mouth coating, slipperiness, smoothness, uniformity, viscosity, and wetness. For example, fat coats the inside of the mouth in a way that fat-free products do not, thus resulting in consumer dissatisfaction with some fat-free products.

Any feature of a particular embodiment of the present invention may be utilized in any other embodiment of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the examples and comparative experiments, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient (or room) temperature is defined as a temperature of about 25 degrees Celsius.

Methods of Measurement

Sample Preparation: Prior to any characterization, all citrus fibers made in accordance with the Examples and Comparative Experiments presented herein below, were milled using a Waring 8010EG laboratory blender (Waring Commercial, USA) equipped with a SS110 Pulverizer Stainless Steel Container using its low speed setting (18000 rpm) for 3 to 5 sec. The milled samples were sieved using a AS200 digital shaker from Retsch GmbH Germany with a sieve set of 10 mm, 500 μm, 250 μm and 50 μm sieves (50×200 mm), sieving conditions: 1 min at amplitude setting 60. Particles larger than 500 μm were milled again until they passed sieve 500 μm.

pH can be measured using any pH-meter known in the art, preferably having an accuracy of 0.1 units. Metler-Toledo; Omega; Hanna Instruments are for example providing such pH-meters. Herein, the pH of a dry fiber was measured by dispersing the fiber in standardized tap water (room temperature ~25° C.) at 2 wt % fiber concentration and 10 min stirring (500 rpm).

Moisture content ("MC"): The moisture content was determined with an infrared moisture balance (MA30, Satorius). The sample was dried at 105° C. The moisture content (in wt %) was calculated as $(A1-A2)/A1\times 100$ where A1 was the weight of the sample before drying in the oven and A2 was the weight of the resulted dried sample.

Dry substance content ("DS") is measured according to formula:

$$DS\,(\%)=100\%-MC\,(\%)$$

Conductivity of a sample: The electrical conductivity (mS/cm or μS/cm) of samples' medium was measured at room temperature (25° C.) with a portable EC/TDS conductimeter (Orchids, France). The conductimeter was calibrated with the calibration solution provided with the device. Before the measurements, the dry fiber was dispersed in 2.0 wt % fiber concentration and stirred with a magnetic stirrer (10 minutes at 500 rpm).

Particle size distribution: The particle size distribution was measured by laser diffraction (Beckman Coulter, LS 13 320, Miami, Florida). A 2.0 wt % fiber dispersion was prepared in the same manner as used for the rheological measurement. Samples were poured into a stirred tank, filled with demineralised water and circulated 2 times into the measuring cell (pumping rate 30%). Laser light having 750 nm wavelength was used as the main laser light source, whereas laser light having wavelength of 450, 600, and 900 nm was used for polarization intensity differential scattering (PIDS). The detection range was 0.04-2000 μm. The volumetric particle size distributions of the samples were calculated from the intensity distributions of the scattered light according to the Fraunhofer optical model using the instrument's software (plant cell wall RI=1.6, water RI=1.33 and absorption coefficient for the dispersion 1) (Verrijssen et al., 2014).

Microscopy Analysis: The microstructure of the non-homogenized and homogenized samples was visualized by means of microscopy, using specific dyes and epifluorescent lightening, as well as normal light. A 2.0 wt % fiber dispersion was prepared in the same manner as used for the rheological measurement. The epifluorescent samples were stained with acridine orange (dilution of 1:100 from 2% concentrated dye) and analyzed using an Olympus BX-41 microscope, equipped with an Olympus XC-50 digital camera and photo-analyzing software. Acridine orange was used as a cationic dye which associates with polyanionic compounds while emitting a green fluorescence. Several microscopic images were taken with objective 10× to create a representable overview of the cell wall suspension.

Rheology measurements

Sample preparation for rheology measurements: a dispersion was made by rehydrating in low conductivity (conductivity about 0 μS/cm) water, standardized water (0.2 wt % NaCl, 0.015 wt % $CaCl_2 \cdot H_2O$ in the low conductivity water, conductivity of about 2.2 mS/cm), milk serum (conductivity about 6.0 mS/cm) or a buffer solution (conductivity 6.6 mS/cm) the milled and sieved samples to achieve a 2.0 wt % fiber concentration. The buffer solution (0.1M Clark-Lubs buffer pH 6.9) was obtained by mixing 500 mL 0.1M potassium phosphate monobasic anhydrous (13.61 g/L) and 259 mL 0.1M sodium hydroxide solution to make up to 1 L with RO water. The pH was checked and adjusted if necessary (tolerance ±0.2 pH unit). The dispersion was prepared by weighing the appropriate amount of medium in a 400 mL glass beaker. The required amount of fiber was weigh into the stainless steel beaker to the nearest 0.01 g, according to the moisture content. The 400 ml glass beaker with redispersion medium was placed on the magnetic stirrer plate set at 750 rpm and after formation of the vortex, pour at once the fiber in the centre of the vortex (the fiber is dispersed at a short distance of the vortex to avoid loss of material on the glass beaker rim). After 30 seconds at 750 rpm, the speed was reduced to 500 rpm and the mixing was continued for 10 minutes. The magnetic bar was removed with a retriever before Silverson mixing. Subsequently, the dispersion was mixed with a Silverson L4RT overhead batch mixer equipped with an Emulsor Screen (with round holes of 1 mm diameter) for 10 minutes at 3500 rpm and allowed to rest for 15 minutes before performing measurements.

Measurements of storage modulus G': The measurements were performed using an MCR302 rheometer from Anton Paar equipped with sand-blasted stainless steel parallel plates of 50 mm diameter and operated at a temperature of 20° C. using a measurement gap of 1.000 mm. To ensure that measurements are carried out on representative samples, the samples were gently stirred using a teaspoon just before placing an aliquot of the sample in the rheometer. A time sweep with strain of 0.1% and frequency of 1 Hz (both within the LVE) was performed for 5 min G' after 5 min was recorded.

Swelling volume (SV) was determined as follows: A 2.0 wt % fiber dispersion was prepared as for the rheological measurement. Next, this dispersion was diluted to 100 mL of a dispersion having 0.2 wt % fiber content was prepared by rehydrating in a Clark-Lubs buffer solution (pH 6.9; 0.1M potassium phosphate monobasic anhydrous $KH_2PO_4$ (13.61 g/L) in RO water) the milled and sieved samples. The dispersion had 0.2 wt % fiber concentrations relative to its total mass. The diluted sample was mixed with the buffer solution by stirring with a magnetic stirrer during 30 minutes at 500 rpm. The dispersion was carefully poured to avoid air entrapping into a 100 mL graded glass measuring cylinder (Brand; ±0.75 mL at 20° C., 2.5 cm internal diameter) while keeping the cylinder slightly tilted. The top of the cylinder was closed using para-film. The closed cylinder was slowly shaken by tilting it ten times to mix and to remove any air bubbles that might be trapped in the dispersion. The cylinder was stored at room temperature in a vibration-free place and the fibers were allowed to settle under gravity. After 24 hours, SV was determined by measuring the volume occupied by the fibers as determined by optical inspection and expressing it as a percentage from the total volume. The higher the volume, the higher and thus better the SV of the sample.

Water Holding Capacity (WHC) and its variation with the G-force was determined as follows: A 2.0 wt % fiber dispersion was prepared as for the rheological measurement. Next, this dispersion was diluted down under stirring (30 min; 400 rpm) with the same buffer solution to reach a diluted slurry having 1 wt % citrus fibers. 100 grams of the diluted slurry (containing 1 gram of fibers) was transferred to a 50 mL self-standing polypropylene centrifuge tubes with plug seal cap (Corning 430897, Corning Inc.) which were previously weighted to determine their mass ($W_0$) when empty. The tubes with the slurry were weighted again ($W_1$) and were centrifuged at 3000 G for 10 minutes with a Centrifuge Labofuge 400 Heraeus. After removing the supernatant (e.g. with a pipette), the weight ($W_2$) of the supernatant and of the tubes ($W_3$) was determined. WHC (in %) was determined according to formula: WHC=$(W_3-W_0)/(W_1-W_0)\times100$.

Milk proteins coagulation test: citrus fibers are dry mixed with low heat skimmed milk powder (Hoogwegt International, Arnhem, The Netherlands) and poured into the vortex of standardised tap water, and mixed with a magnetic stirrer for 30 minutes (see Table):

| Citrus fiber anhydrous (g) | Citrus fiber as is (g) | Standardised tap water (g) | Skimmed milk powder (g) | Total weight (g) |
|---|---|---|---|---|
| 3.0 | 3.0/((100 − m)/100) | 175.5 − [3.0/((100 − m)/100)] | 24.5 | 200.0 |

After 30 minutes, the pH of the dispersion is recorded and the contents are homogenized with a high pressure 2-stages homogenizer GEA Niro Soavi PandaPLUS 2000 at 40 bar (1st stage)/140 bar (2nd stage). The rheology of the dispersion (40.0 g to the nearest 0.1 g) is measured immediately after high pressure homogenization with an Anton Paar MCR 301 Controlled Stress Rheometer serial number 21002742-33025 with the C-ETD 160/ST module serial number SN81310159, measuring system: stirrer ST24-2D/2V/2V-30 serial number 11759 with toolmaster detection anodized aluminum cylinder CC26/ST, with cover to prevent evaporation, circulating cooling water bath set at 15° C.; Segment 1 (non recording): temperature equilibration 20° C., strain 0.1%, frequency 1 Hz, 2 minutes; Segment 2 (recording): oscillatory test, strain sweep 20° C., log strain 0.1-100%, frequency 1 Hz, 40 points 50 s-5 s integration time; Segment 3 (non recording): re-disperse prior heating 20° C., speed 1000 rpm, 10 seconds; Segment 4 (recording): heating ramp 20-92° C., 50 rpm, 450 points of 2 seconds (heating rate 2.8° C./minute); Segment 5 (recording): isothermal segment at 92° C. 92-20° C., 50 rpm, 180 points of 2 seconds; Segment 6 (recording): cooling ramp 92-20° C., 50 rpm, 450 points of 2 seconds (cooling rate 2.8° C./minute); Segment 7 (non recording): temperature equilibration 20° C., strain 0.1%, frequency 1 Hz, 2 minutes; Segment 8 (recording): oscillatory test, strain sweep 20° C., log strain 0.1-100%, frequency 1 Hz, 40 points 50 s-5 s integration time The invention will now be described with the help of the following examples and comparative experiments, without being however limited thereto.

Example 1

Dry lemon spent peel fibers were manufactured as follows:

Step (1) Water was added to de-pectinized lemon peel (a by-product of a pectin extraction process, wherein the pectin was extracted by acid to a level of about 50 wt %, pH about 1.9) to obtain an aqueous slurry having a dry substance content of about 4 wt %. The slurry was sieved through sieve with pore size of 500 μm. The slurry's pH was adjusted with a 10% $NaCO_3$ solution to different values between 1.9 and 7.2. The slurry was one time charged to a pressure homogenizer (APV homogenizer, Rannie 15-20.56) at 600 bars. An aqueous slurry containing citrus fibers was obtained.

Step (2) A precipitation tank was filled with an aqueous isopropanol solution (about 82 wt % isopropanol in water). The aqueous slurry containing citrus fibers was brought under agitation into the precipitation tank by using a volumetric pump and a precipitate in the form of granules having sizes between 5 mm and 50 mm was formed in the tank. The slurry:isopropanol ratio was 1:2. Agitation by stirring was provided while bringing said slurry into the tank and the precipitate was kept in the tank for about 30 minutes.

Step (3) The precipitate was charged to a centrifuge decanter (Flottweg centrifuge) operated at above 4000 rpm, to separate the liquid phase (i.e. water and isopropanol) from the citrus fibers.

Step (4) Steps (2) and (3) were repeated. The slurry: isopropanol ratio was 1:1. The precipitate was subjected to an extraction step to increase the dry substance content. The extraction step was carried out by feeding the precipitate to a screw press. The speed and pressure of the press were adjusted to obtain a semi-dry cake having a dry substance content of about 22 wt %.

Step (5) The semi-dry cake was de-agglomerated in a 1.4 mm slotted sieve.

Step (6) The comminuted cake was dried in a fluidized bed drier at 50° C. for app. 15 min to reach a moisture content of about 8 wt %.

Step (7) The dry fiber cake was sieved (Retsch ZM200 8 k rpm, 250 μm).

The properties of the obtained fibers are presented in FIG. 1.1, wherein the G' of fiber suspensions in low conductivity water (✻) and buffer solution (■) after rehydration is represented vs the pH of the slurry during processing (before homogenisation).

Water holding capacity and swelling volume showed similar trends as G'.

Example 2

Dry lemon peel fibers were manufactured as follows: Example 1 was repeated with the difference that at step (1) the pH was adjusted to 4.4 or maintained as it was (pH as is, not adjusted). The fibers were suspended in low conductivity water (conductivity about 0 μS/cm) or low conductivity water of which conductivity was adjusted to 300-1500 μm/S by adding NaCl. The properties of these fibers are presented in FIG. 1.2 (G' in function of conductivity of the dispersing medium of fibers with pH adjustment to 4.4 and fibers without pH adjustment (pH as is) during processing)

Example 3

The effects of environmental conditions, namely pH and salts, on the microstructural and functional properties of spent lemon peel (i.e. lemon peel subjected to pectin extraction by using acid, to yield acid insoluble lemon peel fibres) subjected to different sequence of processing conditions were investigated.

To this purpose dried pectin containing lemon peels were subjected to an acidic extraction in order to remove most of the pectin therein. The acid insoluble fibre residue (AR), as obtained by acid extraction, was characterized by pH 2.3 and 6.5% dry matter content. The AR was subjected to different sequences of processing operations, as depicted in FIG. 2.1.

In particular, the AR was diluted to 2% (w/w) with standardised tap water and adjusted to pH 2.5, 4.5, 5.5, 7.0, and 10.0 using sodium carbonate or hydrochloric acid. The AR suspension was either wet milled (setups 1 and 2, FIG. 2.1) or not (setup 3, FIG. 2.1). In the former case, the wet milling was performed either after (FIG. 2.1, setup 1) or before (FIG. 2.1, setup 2) the pH adjustment.

Additional samples were prepared by adjusting the AR suspension to pH 4.5, wet milling, and readjusting the pH to 2.5 with HCl (setup 4).

Finally, the AR suspension was adjusted to pH 4.5 and conductivity of 8 mS/cm by addition of either NaCl or CaCl₂), and wet milled (setup 5). Subsequently the obtained AR suspensions were homogenized at 200 bar.

Non-homogenized samples were considered as controls. The non-homogenized and homogenized acid residue suspensions prepared following the different sequences of processing operations were characterized for their electrical conductivity, as well as microstructural and functional properties.

In particular, lemon peel was subjected to an alcohol (ethanol) and acetone extraction step to isolate an alcohol insoluble residue (AIR), i.e. components of said peel, including cell wall material, which are insoluble in ethanol and acetone, by using the method described by McFeeters and Armstrong (1984). Approximately 30 g of pectin containing lemon peel was wetted with 30 g demineralized water. The wetted lemon peel was suspended in 192 ml 95% ethanol using a mixer (mixed 3 times for 6 s) (Buchi mixer B-400, Flawil, Switzerland). The suspension was filtered over a paper filter (Machery-Nagel MN 615 Ø 90 mm). Thereafter, the residue was resuspended in 96 ml 95% ethanol while mixing, and filtered again. Subsequently the residue was suspended in 96 ml acetone using a magnetic stirrer and filtered to obtain the AIR (residue). The AIR was dried overnight at 40° C. The dried AIR was ground with a mortar and pestle and stored in a desiccator until further use. An acid extraction was performed to remove pectin from the AIR. In particular, 60 g of AIR was suspended in 4000 ml of distilled water and incubated for 30 min at 80° C. under stirring. Subsequently, the pH of the suspension was adjusted to 1.6 with 7 N HNO₃, and the incubation was continued for another 60 min Thereafter, the suspension was cooled in an ice bath and centrifuged at room temperature for 10 min at 4000 g. The pectin rich acid supernatant (AF) was separated and the pellet was washed with 1 L distilled water before filtration over a paper filter (Machery-Nagel MN 615 Ø 90 mm).

The acid residue (AR) was suspended in standardized tap water (0.2% NaCl and 0.015% CaCl·2H₂O in MilliQ water) in concentration equal to 2% (w/w). Thereafter, the pH of the AR suspensions was adjusted to pH 2.5, 4.5, 5.5, 7.0 and 10 using a few drops of 2 M Na₂CO₃ and 1 M HCl under magnetic stirring as already mentioned above. Magnetic stirring was performed overnight and the final pH checked. Additional samples were prepared by adding to the AR suspension NaCl or CaCl₂ until the conductivity of the suspension was equal to 8 mS/cm.

Prior to or after pH adjustment, AR or AIR suspensions were wet milled with an Ultra-Turrax (UT) (IKA, Staufen, Germany) for 10 min at 8000 rpm to obtain a homogenous suspension. Acid residue suspensions adjusted to the different pH and conductivity values, either subjected or not to wet milling, were homogenized using a high pressure homogenizer Pony NS2006L (pH adjusted samples) or Panda 2 k NS1001L (conductivity adjusted samples) (GEA Niro Soavi, Parma, Italy) at 200 bar. Non-homogenized samples (0 bar) were considered as control.

The electrical conductivity of the AR suspensions in standardized tap water was measured at room temperature with a portable EC/TDS conductimeter (Orchids, France). The conductimeter was calibrated with the calibration solution provided with the device. Before the measurements the homogenized AR suspensions were diluted 10 folds with MilliQ water and gently stirred to obtain an homogenous suspension. The conductivity values were then corrected for the dilution factor.

As a consequence of the pH adjustment, AR suspensions having different pH, from 2.5 to 10, were also characterized by different sodium carbonate content, and thus potentially different electrical conductivity. Therefore, the electrical conductivity of the AR suspensions adjusted to different pH values and processed according to the experimental setups 1, 2, and 3 (FIG. 2.1) was measured (FIG. 3.1).

When considering the same pH value, similar conductivity values were obtained regardless of the sequence of processing operations (FIG. 2.1, setup 1, 2, and 3). This suggests that the conductivity of the AR suspensions was affected only by the pH adjustment and not by the other processing operations.

Interestingly, the increase in pH from 2.5 to 10, due to the increasing amount of $Na_2CO_3$ added to the AR suspensions, did not correspond to a progressive increase in conductivity. In particular, AR suspensions adjusted to pH ranging from 2.5 to 7 were characterized by similar conductivity values of about 2-4 mS/cm. By contrast, the AR suspensions adjusted to pH 10 were characterized by higher conductivity values of about 8-10 mS/cm. Being the electrical conductivity dependent on the concentration as well as the mobility of the ions in solution, the present results suggest that the lemon peel acid insoluble fibres could bind the ions present in solution thus limiting their mobility. In particular, up to pH 7 the binding capacity of the fibres (i.e. most likely the residual pectin fraction) resulted in negligible changes in conductivity despite the increase in ion concentration due to the higher amount of $Na_2CO_3$ added to the suspensions. On the other hand, at pH 10 the addition of extra ions would reach a concentration beyond the binding capacity of the fibres, giving reason for the increase in conductivity.

The adsorption of ions on the surface of the fibres as well as the different pH conditions might influence the fibre-fibre interactions, for instance due to electrostatic forces, and consequently the microstructure as well as the functionality of the AR suspensions upon processing. Therefore, the microstructure of the AR suspensions prepared according to the different sequences of processing operations (FIG. 2.1, setup 1, 2, 3, and 4), non-homogenized and homogenized at 200 bar, was investigated by normal light and epifluorescence with acridine orange microscopy.

When considering the wet milled non-homogenized samples, the micrograph's show that different pH values resulted in differences in the AR suspension microstructure. In particular, in the AR suspensions adjusted to pH 2.5 (close to the original pH of the AR) some particle aggregation could be visually observed by light microscopy. On the contrary, in the micrographs of the AR suspensions adjusted to the other pH values (4.5-10) more uniformly distributed particles were observed.

It is noteworthy that no clear differences in microstructure were detected depending on the sequence of pH adjustment and wet milling operations, suggesting that pH influenced the effect of low mechanical shear (wet milling) on the lemon peel acid insoluble fibres to a limited extent.

The samples that were not subjected to the wet milling operation showed larger particles than the wet milled samples. In addition, depending on pH also in the non-wet milled samples some differences in microstructure were observed. More specifically, larger particle aggregates/clusters were visually observed in the AR suspensions adjusted to pH 2.5, 4.5, 7.5, and 10 as compared to the AR suspensions adjusted to pH 5.5. Upon high pressure homogenisation (200 bar) an overall disruption of the particles and particle aggregates was observed. In particular, in the wet milled and homogenized samples adjusted to pH 2.5 and 10 the disrupted material tended to clump together. On the other hand, the samples adjusted to pH 4.5, 5.5, and 7 showed a very uniformly distributed disrupted material.

With regard to the non-wet milled homogenized samples, the micrographs of the AR suspensions adjusted to pH 5.5 showed a uniformly distributed disrupted material, whilst the micrographs of the AR suspensions adjusted to pH 2.5, 4.5, 7, and 10 showed the presence of clumped material. According to the present microscopy observations, pH seemed to affect the microstructure of the homogenized AR fibres by inducing clumping (mainly at pH 2.5 and 10). On the other hand, The AR suspensions adjusted to pH 4.5, 5.5, and 7 showed a more uniform/homogeneous matrix.

The clumping of the homogenized fibre material can be tentatively attributed to electrostatic interactions among the particles. However, the effect of pH on the microstructure of the homogenized AR suspensions was found to be different whether the AR suspensions were subjected (either before or after pH adjustment) or not to wet milling prior to homogenisation.

To confirm the effect of pH in the microstructural changes of the lemon peel acid insoluble fibres during homogenisation (AR), the microstructure of the AR adjusted to pH 4.5, wet milled, and readjusted to pH 2.5 prior to homogenisation at 200 bar was also investigated by light and epifluorescence with acridine orange microscopy. It was apparent that the second pH adjustment determined a significant clumping of the acid insoluble lemon peel fibres. This clumping supports the hypothesis of electrostatic interactions of the fibres. Upon high pressure homogenisation (200 bar), a decrease in the clump size was observed. However, the fibre matrix seemed not as uniform as in the micrographs of the AR suspension adjusted at pH 4.5, wet milled and homogenised.

The effect of pH and sequence of processing operations on the microstructure of the AR suspensions was further investigated by laser diffraction analysis. All the AR suspensions, regardless of the pH and the sequence of processing operations, presented a unimodal distribution of particle size (data not shown). Therefore, the samples were quantitatively compared based on the average particle diameter (D50) (FIG. 3.2).

In general, the average particle diameter of the non-homogenized (0 bar) AR suspensions resulted to be larger than that of the respective homogenized (200 bar) suspensions, regardless of the pH and sequence of processing operations. When considering the effect of the pH on the average particle diameter, no clear effect could be observed in the wet milled non-homogenized AR suspensions (AR-pH-UT-HPH and AR-UT-pH-HPH).

In particular, a slight decrease in the average particle diameter with increasing pH values was observed when the pH of the AR suspension was adjusted prior to wet milling (AR-pH-UT-HPH, 0 bar) (FIG. 3.2). On the other hand, similar average particle diameter was obtained when the pH of the AR suspensions was adjusted following wet milling (AR-UT-pH-HPH, 0 bar) (FIG. 3.2). By contrast, when the AR suspension adjusted to pH 4.5 and wet milled (0 bar) was readjusted to pH 2.5, larger particle diameter than the respective non-readjusted suspension was observed. This result is consistent with the clumping observed under light and epifluorescence microscopy and supports the hypothesis of electrostatic interactions among the AR fibres due to different pH conditions. With regard to the non-wet milled AR suspensions, consistently with what observed under the microscope, the average particle diameter of the non-homogenised samples (AR-pH-HPH, 0 bar) resulted to be larger than that of the wet milled non-homogenised samples (AR-pH-UT-HPH and AR-UT-pH-HPH). In particular, a larger particle diameter was found for the AR suspensions adjusted to pH 2.5, 4.5 and 7 (FIG. 3.2).

On the other hand, the homogenised AR suspensions resulted in similar particle size, whether the homogenisation was preceded or not by wet milling, with the only exception of the AR suspension adjusted to pH 10. In the latter case, the AR suspensions were characterised by slightly higher particle diameter than the suspensions adjusted to the other pH values.

It was observed that different pH conditions can lead to differences in the microstructure (clumping effect) of the AR suspension as a consequence of electrostatic interactions among the particles. In addition, while low mechanical shear (i.e. wet milling) could not completely destroy such clumps, they were easily broken down by the high shearing forces the fibres underwent upon HPH.

The effect of pH and sequence of processing operations on the technological properties of the AR suspensions was investigated by rheological analyses. In this context, the AR suspensions were characterised for their viscoelastic behaviour by performing a strain and a frequency sweep. The objective of the strain sweep was to identify the range of strain amplitude within which changes in storage (G') and loss (G") moduli are independent of the strain (linear viscoelastic region). A strain of 1% was found to be within the linear viscoelastic region and was applied in the frequency sweep tests. FIG. 3.3 shows as an example the storage and loss moduli as a function of frequency of the AR adjusted to pH 4.5, before or after wet milling, wet milled and homogenised at 200 bar prior or not to second pH adjustment to 2.5.

All the samples were characterised by storage modulus (G') higher than the loss modulus (G"), that indicates the presence of a network structure. With regard to the network stiffness, given by the ratio between G" and G' (tan δ), similar values of about 0.2, consistent with a weak gel-like structure, were found for all the AR suspensions regardless of the pH conditions and the sequence of processing operations (data not shown). Similarly, irrespective of the pH and sequence of processing operations, G' was found to be rather independent of frequency (plateau). Therefore, the functionality of the different samples was compared based on the G' value corresponding to 1 Hz frequency (FIG. 3.4).

By comparing the G' values relevant to the non-homogenised AR suspensions (AR-pH-UT-HPH, AR-UT-pH-HPH, and AR-pH 4.5-UT-pH-HPH, 0 bar) (FIG. 3.4), a clear effect of pH as well as sequence of processing operations on the functionality of the samples could be observed. In particular, the functionality of the AR suspensions adjusted to pH 2.5 was generally the lowest. On the other hand, the AR suspensions adjusted to the other pH values, before or after wet milling, showed better functionality, with G' values ranging from about 100 to 350 Pa. With regard to the non-wet milled AR suspensions (AR-pH-HPH), a very low functionality was observed at each pH value (G'<100 Pa). It is worth noting that the AR suspension adjusted to pH 4.5, wet milled, and readjusted to pH 2.5 (non-homogenised) (AR-pH 4.5-UT-pH-HPH) resulted in lower functionality than the corresponding AR suspensions adjusted to pH 2.5 and 4.5 and wet milled (before or after pH adjustment). These results suggest that pH determined, to some extent, the sensitivity of the lemon peel acid insoluble fibres to low shearing forces (i.e. wet milling).

Upon homogenisation at 200 bar, a general increase in functionality of the AR supensions was observed (FIG. 3.4). Such increase in G' values seemed to depend on both the pH of the suspensions and the processing operations preceding the high pressure homogenisation. More specifically, homogenisation of the wet milled AR suspensions (AR-pH-UT-HPH and AR-UT-pH-HPH, FIG. 3.4) resulted in the highest G' values at pH ranging from 4.5 to 7. Lower G' values were obtained for the AR adjusted to pH 10, and 2.5, the latter being the lowest. By contrast, no effect of the sequence of processing operations (i.e. wet milling before or after pH adjustment) were observed. On the other hand, the non-wet milled and homogenised AR suspensions (AR-pH-HPH) where characterised by lower functionality and a different dependency of G' on the pH. In particular, the AR adjusted to pH 5.5 and directly homogenised showed the highest functionality, followed by the AR suspension adjusted to pH 4.5, and ultimately by the AR suspensions adjusted to pH 10, 7, and 2.5. In addition, when the AR suspension was adjusted to pH 4.5, wet milled and readjusted to pH 2.5 prior to homgenisation, lower G' than the AR suspensions homogenised at pH 4.5 (AR-pH-UT-HPH and AR-UT-pH-HPH) was obtained (FIG. 3.4). According to the present results, the pH of the suspension played a crucial role in determining the effect of high pressure homogenisation on the viscoelastic behaviour of the lemon peel acid insoluble fibres. In particular, different pH values would determine different charge states of the fibres, and especially of the residual pectin. The latter are neutral at pH lower than 3.5, and become anionic at higher pH values. The electrostatic interactions (repulsion) occurring among the charged polymers would assist the mechanical disintegration and unfolding of the fibres upon high pressure homogenisation, thus determining an increase in the water holding capacity of the fibrous matrix and higher G' values of the AR suspensions. Nevertheless, the increase in G' as a function of pH of the AR suspension was not progressive. Therefore, these results suggest that pH was not the only environmental condition affecting the electrostatic interactions among the lemon peel acid insolble fibres. In fact, due to further addition of $Na_2CO_3$ the adjustment of the pH concomitantly determined a different salt (ion) concentration in the AR suspensions. The presence of ions in solution can also affect the electrostatic interactions among the fibres. In this regard, at pH 2.5 the fibres are likely not charged and no electrostatic forces occur among them. On the other hand, at pH values ranging between 4.5 and 7 the increase in the fibre charge and in the ions content would couterbalance one another, thus resulting in similar values G' (FIG. 3.4) and conductivity values of the AR suspensions. Finally, at pH 10 the excess ions present in solution would screen the fibre charges thus determining lower electristatic repulsions, lower G' values and higher conductivity of the AR suspension. To verify this hypothesis, the effect of the addition of salts, namely NaCl and $CaCl_2$, on the microstructure and rheological properties of the lemon peel acid insoluble fibre suspensions was investigated.

The AR suspension was adjusted to pH 4.5 and NaCl or $CaCl_2$ were added until a conductivity value of 8 mS/cm was obtained. The suspensions were wet milled and either non-homogenised (0 bar) or homogenised (Panda 2 k, Gea Niro Soavi, Parma, Italy) at 200 bar. Additional samples were prepared by adjusting the AR suspension to pH 10 (conductivity 8 mS/cm). The AR suspension adjusted to pH 10 was subjected to wet milling and either non-homogenised (o bar) or homogenised at 200 bar. The AR suspensions adjusted to pH 4.5 and 10 were considered as controls. The microstructure of the AR suspensions was investigated by light microscopy (data not shown) and epifluorescence with acridine orange microscopy.

Similarly to what previously observed, the micrographs of the non-homogenised AR suspensions show the presence of undisrupted particles. No clear effect of the addition of NaCl on microstructure could be observed in the non-homogenised AR suspension adjusted to pH 4.5. By contrast, the addition of $CaCl_2$ to the AR suspension adjusted to pH 4.5 resulted in clumping/aggregation of particles.

Upon high pressure homogenisation, an overall disruption of the matrix was observed under by microscopy analysis. Consistently with what previously observed, the AR adjusted to pH 4.5 wet milled and homogenised at 200 bar resulted in homogeneously dispersed disrupted material. On the other hand, the addition of both NaCl and $CaCl_2$, as well as the adjustment of pH to 10 determined clumping of the disrupted material to a similar extent.

The microstructure of the AR suspensions was further characterised by laser diffraction analysis. Also in this case, the average D50 was considered to quantify differences among the samples (FIG. 3.5).

The average D50 of the non-homogenised (0 bar) AR suspensions adjusted to pH 4.5 and 10 was larger than that of the corresponding homogenised (200 bar) suspensions. The decrease in particle size upon high pressure homogenisation was consistent with the particle disruption observed under the microscope. With regard to the AR suspension adjusted to pH 4.5 and conductivity of 8 mS/cm with NaCl, the non-homogenised (0 bar) sample was characterised by slightly larger particles than the non-homogenised AR suspensions adjusted to pH 4.5 and 10. Upon homogenisation, the average D50 of the AR suspension to which NaCl was added decreased to similar values to those observed for the homogenised AR suspensions adjusted to pH 4.5 and 10. By contrast, the addition of $CaCl_2$ (AR-pH 4.5-cond $CaCl_2$) to the AR suspension adjusted to pH 4.5 resulted in lower average D50 of the non-homogenised suspension, and larger average D50 of the homogenised one than the corresponding AR suspensions adjusted to pH 4.5 and 10.

According to microscopy and laser diffraction results, the addition of different salts determined different effects on the microstructure of the lemon peel acid insoluble fibres likely due to different fibre-fibre electrostatic interaction. The effect of the addition of salts on the viscoelastic properties of the non-homogenised and homogenised AR suspensions was investigated by rheological analysis. The G' values of the different samples are presented in FIG. 3.6.

Small differences in G' values were observed for the non-homogenised suspensions, being the G' of the AR adjusted to pH 4.5 (AR-pH 4.5-UT, 0 bar) the highest, and the G' of the AR adjusted to pH 4.5 and conductivity of 8 mS/cm with $CaCl_2$ (AR-pH 4.5-cond $CaCl_2$-UT, 0 bar) the lowest. Upon homogenisation, an overall increase in the functionality of the suspensions was observed, however to a different extent. In particular, the AR suspensions adjusted to pH 4.5 showed the highest functionality (G' value). As previously observed, the homogenisation of the AR suspension adjusted to pH 10 resulted in lower G' values than pH 4.5. Similarly, the addition of salts (and thus ions) to the AR suspension adjusted at pH 4.5 resulted in a decrease in the functionality of the bulk sample. These results support the hypothesis that not only the pH but also the ion concentration are important factors determining the functionality of the lemon peel acid insoluble fibre suspension upon high pressure homogenisation. In particular, the addition of NaCl and $CaCl_2$ determined an increase in the ion concentration (conductivity) of the AR suspension without affecting the pH (and thus the charge of the fibres). Under these environmental conditions, the ions present in solution would screen the charges on the polymer surface and decrease the fibre-fibre electrostatic interactions. In addition, it should be noted that the addition of $CaCl_2$) had a more detrimental effect than the addition of NaCl. In this regard, divalent ions ($Ca^{2+}$) could generate intermolecular interactions between residual pectin polymers on the AR suspension, thus resulting in a more compact fibre lump with lower hydration capacity.

Commercial Samples 1 to 6

Various commercial samples (CS.1 to CS.6) were also investigated in terms of their pH and G' values.

All results are presented in Table 1.

| Fiber (from 6 to 10% moisture) | pH | G' (Pa) in standardized tap water | G' (Pa) in buffer, pH 6.9 | G' (Pa) in low cond. water (0 μS/cm) |
|---|---|---|---|---|
| CS.1 | 6.05 | 3.16 | 1.9 | |
| CS.2 | 4.11 | 0.29 | 29.03 | |
| CS.3 | 3.12 | 42.19 | 112.8 | |
| CS.4 | 3.14 | 42.97 | 100.5 | |
| CS.5 | 3.48 | 217.4 | 290.2 | |
| CS.6 | 3.77 | | 127 | 167 |

Influence of Organic Solvent Washing on pH of Peel

An investigation of the influence of solvent washing on citrus fibers manufacturing processes such as the one disclosed in DE 199 43 188 was carried out. Acid treated lemon peel (pH about 2.5) was homogenized and washed with isopropyl alcohol before drying to obtain dry citrus fibers. The pH of the fibers were 3.3.

The natural pH of citrus peel from various citrus fruits, e.g. lemon, lime, orange and the like, was measured and found to be between 1.9 and 2.9, Washing the peel with organic solvent did not lead to pH increases above 3.7.

Examples Dairy Products

The citrus fibers are dry mixed with low heat skimmed milk powder (Hoogwegt International, Arnhem, The Netherlands) and poured into the vortex of standardised tap water, and mixed with a magnetic stirrer for 30 minutes.

| Citrus fiber anhydrous (g) | Citrus fiber as is (g) | Standardised tap water (g) | Skimmed milk powder (g) | Total weight (g) |
|---|---|---|---|---|
| 3.0 | 3.0/((100 − m)/100) | 175.5 − [3.0/ ((100 − m)/100)] | 24.5 | 200.0 |

FIG. 4.1 shows the normalised apparent viscosity (at 50 rpm) versus temperature and time. The coagulation is indicated by a sharp increase of the normalised viscosity during the holding isothermal segment at 92° C.

The data in the table below is the data set of 24 fibers indicating the pH of the fiber in the skimmed milk powder and the presence or absence of coagulation:

| pH of slurry during process (FIG 3.6) | 1.91 | 2.48 | 3.24 | 3.60 | 4.08 | 4.95 |
|---|---|---|---|---|---|---|
| pH in skimmed milk powder (1.5% concentration) | 6.07 | 6.17 | 6.21 | 6.27 | 6.33 | 6.37 |
| Coagulation Yes / No | Yes | Yes | Yes | Yes | No | No |

The invention claimed is:

1. Dry citrus fibers comprising:

citrus fibers; and an additive selected from the group consisting of sugar, protein, polyol, and combinations of two or more thereof, wherein said dry citrus fibers have:

a moisture content of at most 20 wt % relative to a total amount of the dry citrus fibers;

a storage modulus (G') of at least 280 Pa measured on an aqueous medium containing an amount of 2 wt % of the dry citrus fibers relative to a total weight of the aqueous medium;

a pH of between 4.0 and 8.7; and a crystallinity of at least 10% and at most 60%; and wherein said citrus fibers are prepared from citrus peel subjected to a de-pectinization process to extract at least 10 wt % of pectin relative to a total weight of the citrus peel.

2. The dry citrus fibers of claim 1, wherein the pH is between 4.5 and 7.0.

3. The dry citrus fibers of claim 1, wherein the moisture content is at most 15 wt %.

4. The dry citrus fibers of claim 1, wherein the moisture content is at most 12 wt %.

5. A food composition comprising the dry citrus fibers of claim 1, wherein the food composition is selected from the group consisting of luxury drinks, milk component-containing drinks, nutrition-enriched drinks, dairy products, iced products, processed fat food products, soups, stews, seasonings, paste condiments, fillings, gels, paste-like food products, food products containing cereals as the main component, cakes, kneaded marine products, live-stock products, daily dishes, foods of delicate flavor, liquid diets, supplements, and pet foods.

6. A dairy product comprising the dry citrus fibers of claim 1.

7. The dairy product of claim 6, comprising a fat, wherein at least 20 wt % of said fat is substituted by the dry citrus fibers.

8. The dairy product of claim 6, wherein the dairy product is selected from the group consisting of yoghurt, sour cream, cheese, pudding, and dairy based frozen desserts.

9. A method of preparing a dairy product, the method comprising:

formulating the dairy product such that the dairy product comprises the dry citrus fibers of claim 1.

10. The method of claim 9, wherein the dairy product contains a fat and wherein when formulating said dairy product, at least 20 wt % of said fat is substituted by the dry citrus fibers.

11. The dry citrus fibers of claim 1, wherein the G' is at least 450 Pa.

12. The dry citrus fibers of claim 1, wherein the dry citrus fibers have a pH of at least 4.5 and at most 6.5.

13. The dry citrus fiber of claim 1, wherein the additive is present in an additive to citrus fiber (A:F) ratio of between 0.1:1.00 and 10.00:1.00 by weight.

14. The dry citrus fiber of claim 1, wherein the sugar is selected from the group consisting of fructose, mannose, galactose, glucose, talose, gulose, allose, altrose, idose, arabinose, xylose, lyxose, sorbose, and ribose.

15. The dry citrus fiber of claim 1, wherein the sugar comprises oligosaccharides selected from the group consisting of sucrose, maltose, lactose, lactulose, and trehalose.

16. The dry citrus fiber of claim 1, wherein the protein comprises gelatin, pea protein or pea protein hydrolisates.

17. The dry citrus fiber of claim 1, wherein the polyol comprises sugar alcohols selected from the group consisting of glycerol, erythritol, threritol, arabitol, xylitol, ribitol, mannitol, sorbitol, galactitol, fucitol, iditol, inositol, volemitol, isomalt, lactitol, maltotriitol, maltotetraitol, polyglycitol, and combinations of two or more thereof.

*     *     *     *     *